(12) United States Patent
Olsen et al.

(10) Patent No.: US 6,321,891 B1
(45) Date of Patent: Nov. 27, 2001

(54) HYDROKINETIC TORQUE CONVERTER

(75) Inventors: Steven Olsen, Bühl; Johannes Hahn, Gernsbach, both of (DE); Volker Middelmann, Wooster, OH (US); Hubert Friedmann, Muggensturm; Marc Meisner, Bühl-Weitenung, both of (DE)

(73) Assignee: LuK Getriebe-System GmbH, Buhl/Baden (DE)

( * ) Notice: Subject to any disclaimer, the term of this patent is extended or adjusted under 35 U.S.C. 154(b) by 0 days.

(21) Appl. No.: 09/640,207

(22) Filed: Aug. 16, 2000

Related U.S. Application Data

(60) Continuation of application No. 09/159,108, filed on Sep. 23, 1998, which is a division of application No. 08/685,198, filed on Jul. 18, 1996, now Pat. No. 5,813,505.

(30) Foreign Application Priority Data

Jul. 19, 1995 (DE) ............................................. 195 26 123
Jul. 20, 1995 (DE) ............................................. 195 35 653

(51) Int. Cl.$^7$ .................................................. F16H 45/02
(52) U.S. Cl. ......................................... 192/3.29; 192/200
(58) Field of Search ............................... 192/3.28, 3.29, 192/3.3, 200, 212

(56) References Cited

U.S. PATENT DOCUMENTS

| | | | |
|---|---|---|---|
| 2,130,895 | * 9/1938 | Ness ................................ | 192/3.28 X |
| 3,839,864 | * 10/1974 | Ahlen ................................ | 192/3.3 X |
| 4,580,668 | * 4/1986 | Pickard et al. ....................... | 192/3.29 |
| 4,986,398 | * 1/1991 | Olsen ................................. | 192/3.28 |
| 5,674,155 | * 10/1997 | Otto et al. ......................... | 192/3.3 X |
| 5,746,296 | * 5/1998 | Wirtz ................................. | 192/3.29 |
| 5,813,505 | * 9/1998 | Olsen et al. ........................ | 192/3.28 |
| 5,819,896 | * 10/1998 | Fallu ................................. | 192/3.29 |

* cited by examiner

Primary Examiner—Charles A. Marmor
Assistant Examiner—Saúl Rodríguez
(74) Attorney, Agent, or Firm—Darby & Darby

(57) ABSTRACT

A hydrokinetic torque converter in the power train between the engine and the wheels of a motor vehicle has a rotary engine-driven housing which is of one piece with a pump and contains a rotary turbine having a hub which drives the input shaft of a transmission. A lockup clutch can be engaged, either entirely or with slip, to transmit torque from the housing or from the pump to the hub of the turbine. Such clutch can employ flat or conical friction linings and/or friction surfaces, for example, a friction lining on the shell of the turbine and a friction surface on a wall of the housing. The shell of the turbine in the torque converter employing such clutch is movable axially to advance the friction lining into or from engagement with the friction surface. Alternatively, the lockup clutch can be installed in a torus which is defined by the turbine and the pump of the torque converter, and such clutch can be cooled by one or more streams of a hydraulic fluid.

12 Claims, 22 Drawing Sheets

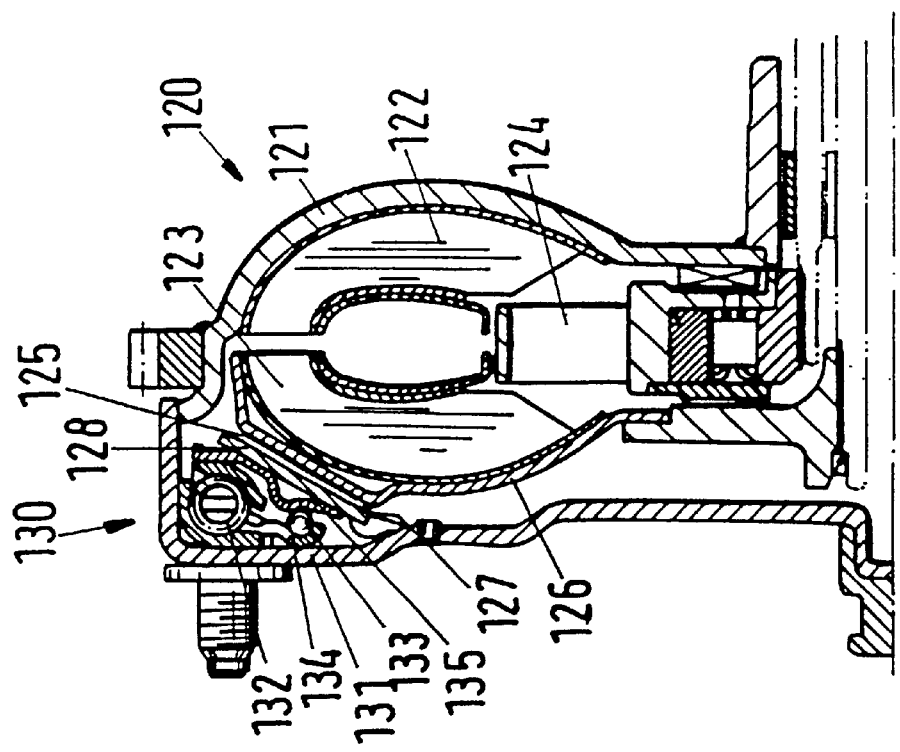
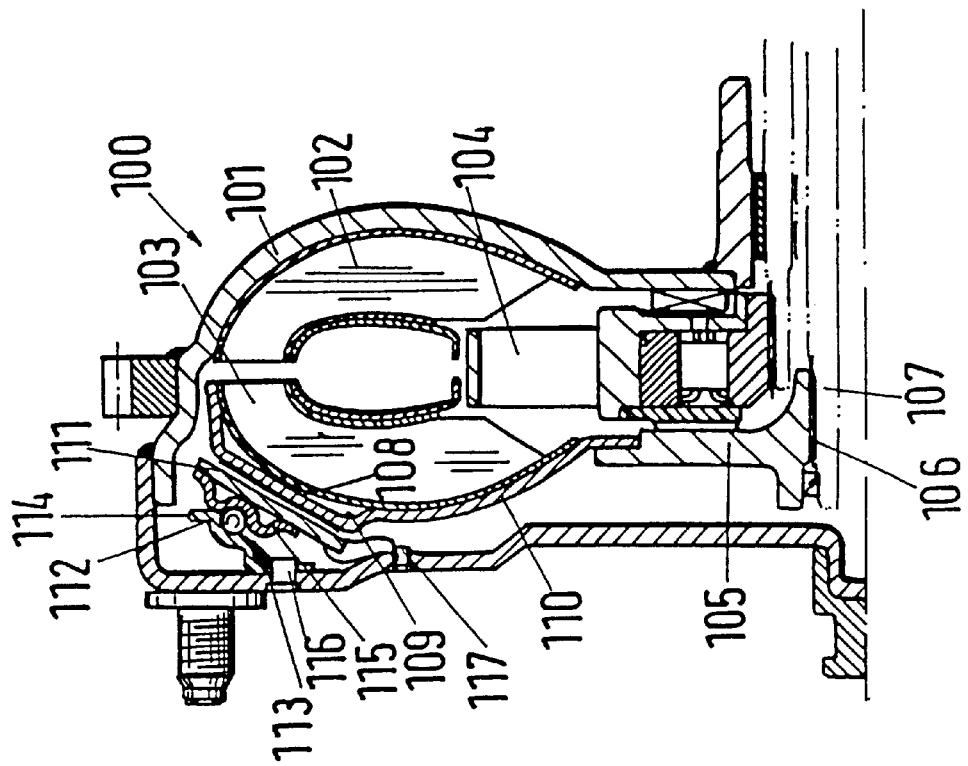

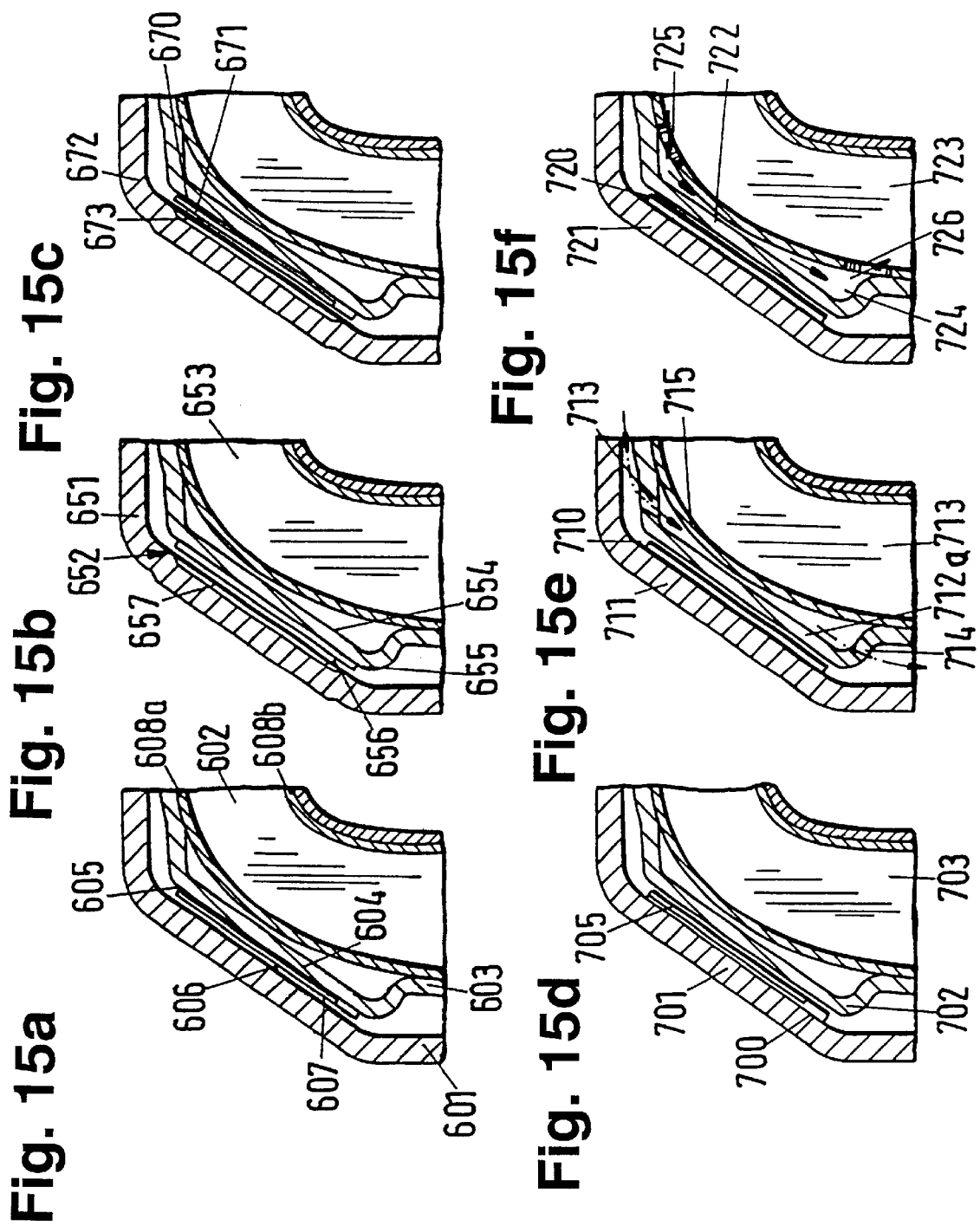

HYDROKINETIC TORQUE CONVERTER

This is continuation of continued prosecution application Ser. No. 09/159,108, filed Sep. 23, 1998, which is a division of application Ser. No. 08/685,198, filed Jul. 18, 1996, now U.S. Pat. No. 5,813,505 granted on Sep. 29, 1998. Each of these prior applications is hereby incorporated herein by reference, in its entirety.

BACKGROUND OF THE INVENTION

The invention relates to improvements in hydrokinetic torque converters of the type often employed in the power trains of motor vehicles. More particularly, the invention relates to improvements in hydrokinetic or hydrodynamic torque converters of the type wherein a rotary housing normally confines a pump, a turbine, a stator (if necessary), and a suitable lockup clutch or bypass clutch. The pump can receive torque from a prime mover (such as the combustion engine of a motor vehicle), for examples by way of the housing, and the turbine can drive a rotary part, e.g., the input shaft of a transmission in a motor vehicle. It is also known to equip a hydrokinetic torque converter with a torsional vibration damper which is installed in the path of transmission of torque between the input and output members of the torque converter. As a rule, the turbine is installed in the housing between the pump and a wall of the housing, normally a wall confronting the output element of the prime mover and being disposed between such output element and the turbine, as seen in the axial direction of the housing.. The lockup clutch is engageable and disengageable in response to a change of fluid pressure in a compartment which is provided in the housing between the turbine and a wall of the housing.

Published German patent application No. 44 20 959 discloses a hydrokinetic torque converter employing a lockup clutch wherein a friction lining is applied to a piston which is movable relative to the turbine in the axial direction of the pump. For example, the lockup clutch can employ an annular piston.

A drawback of the just outlined torque converters is that the utilization of a piston which is movable in the housing in the axial direction of the turbine and pump renders it necessary to increase the space requirements of the torque converter accordingly (as seen in the axial direction of the pump and turbine) This is in contrast with the trend toward larger and more powerful engines and toward larger transmissions, i.e., it is desirable to reduce the space requirements of the power train between the engine and the transmission to a minimum.

OBJECTS OF THE INVENTION

An object of the invention is to provide a hydrokinetic torque converter which is constructed and assembled in such a way that its space requirements in the direction of the axis of rotation of the pump and turbine are considerably below those of heretofore known torque converters.

Another object of the invention is to provide a hydrokinetic torque converter whose space requirements in the direction of the common axis of the pump and turbine are less than those of conventional torque converters even if the improved torque converter is equipped with one or more torsional vibration dampers.

A further object of the invention is to simplify the making and the assembly of hydrokinetic torque converters.

An additional object of the invention is to provide a hydrokinetic torque converter wherein the total number of parts is less than that in heretofore known torque converters.

Still another object of the invention is to provide a novel and improved distribution of component parts in the housing of a hydrokinetic torque converter.

Another object of the invention is to provide a novel and improved lockup clutch or bypass clutch for use in the above outlined improved hydrokinetic torque converter.

A further object of the invention is to provide a power train which embodies the above outlined hydrokinetic torque converter.

An additional object of the invention is to provide a novel and improved torsional vibration damper for use in the above outlined hydrokinetic torque converter.

Still another object of the invention is to simplify the configuration and the manufacturing cost of various parts in the above outlined improved hydrokinetic torque converter.

SUMMARY OF THE INVENTION

One feature of the invention resides in the provision of a novel and improved compact hydrokinetic torque converter of the type comprising a housing, a turbine and a rotary pump in the housing, means for rotating the pump (particularly by way of the housing), and a lockup clutch or bypass clutch (hereinafter called lockup clutch) in the housing. The torque converter can further comprise a stator installed in the housing between the pump and the turbine, as seen in the direction of the axis of rotation of the pump. A torsional vibration damper can be installed between the input and output members of the torque converter.

In accordance with one feature of the invention, the improved hydrokinetic torque converter comprises a housing, a pump provided in the housing and being rotatable about a predetermined axis, means for rotating the pump about such axis (the means for rotating can comprise a prime mover, such as the combustion engine of a motor vehicle, which has a rotary output element serving to transmit torque to the pump, e.g., by way of the housing), a turbine disposed in the housing between the pump and a wall of the housing (particularly a wall which is adjacent the aforementioned rotary output element of the prime mover), as seen in the direction of the axis, and a torque transmitting lockup clutch in the housing. The turbine is movable in the housing in the direction of the axis to thus select the magnitude of the torque being transmitted by the clutch, and the clutch includes an element (e.g., a carrier element in the form of a lamina) having at least one friction surface and sharing the axial movements of the turbine relative to the housing.

A stator (which is optional, at least in certain instances) can be installed in the housing between the pump and the turbine, as seen in the direction of the axis. A torsional vibration damper (or at least one torsional vibration damper) can be installed in the housing between rotary input and output members of the torque converter. The aforementioned carrier element can be of one piece with the turbine, or the torque converter further comprises means for securing a separately produced carrier element to the turbine. The housing and the turbine can define a compartment which is disposed between the aforementioned wall of the housing and the turbine, as seen in the axial direction of the pump; such compartment can receive a pressurized fluid to thus vary the condition of the lockup clutch toward a more pronounced engagement or toward a less pronounced engagement, depending on the magnitude of the torque which is to be transmitted by the clutch.

Another feature of the invention resides in the provision of a hydrokinetic torque converter which comprises a housing, a pump disposed in the housing and rotatable about a predetermined axis, means for rotating the pump about the axis, a turbine provided in the housing between the pump and a wall of the housing, as seen in the direction of the axis, and a torque transmitting lockup clutch in the housing. The turbine is at least substantially fixed in the housing against movement in the direction of the axis, and the lockup clutch includes an element having at least one friction surface and being movable relative to the turbine in the direction of the axis of the pump to thus select the magnitude of torque being transmitted by the clutch.

Such torque converter can also comprise a stator in the housing as well as at least one torsional vibration damper between the input and output members of the torque converter.

A further feature of the invention resides in the provision of a hydrokinetic torque converter which comprises a hosing, a pump provided in the housing and being rotatable about a predetermined axis, means for rotating the pump about the axis, a rotary turbine installed in the housing between the pump and a wall of the housing, as seen. in the direction of the axis of the pump, a rotary member which is driven by the turbine, and a lockup clutch in the housing. The turbine is movable in the housing in the direction of the axis of the pump through a distance between zero and a predetermined value to thus select the magnitude of the torque to be transmitted by the clutch. The clutch includes an element having at least one friction surface, and the torque converter further comprises means for biasing the element against the turbine in the direction of the axis of the pump. The housing and the turbine define between themselves a compartment (as seen in the direction of the pump axis), and such compartment serves to receive a pressurized fluid to thus vary the condition of the clutch, i.e., to cause the lockup clutch to transmit a greater or lesser torque.

The just discussed torque converter can also comprise a stator in the housing between the pump and the turbine, as seen in the axial direction of the pump. Still further, at least one torsional vibration damper can be installed between the input and output members of such torque converter.

An additional feature of the invention resides in the provision of a hydrokinetic torque converter which comprises a housing, a pump provided in the housing and being rotatable about a predetermined axis, a rotary turbine disposed in the housing between a wall of the housing and the pump (as seen in the direction of the pump axis), and a lockup clutch in the housing. The turbine and the pump define the core of a torus, and the clutch is provided at such core and includes an input element provided with at least one friction surface which is engageable with the pump and an output element provided with at least one second friction surface which is engageable with the turbine.

The just outlined torque converter can further comprise a stator, and the aforementioned core of the torus can be provided at least substantially centrally of the housing between the turbine, pump and stator. At least one of the at least two friction surfaces can constitute a circular surface which is disposed at the core of the torus, as seen in the radial direction of the housing. At least one of the friction surfaces can constitute a plane circular surface or a conical surface.

Still another feature of the invention resides in the provision of a hydrokinetic torque converter which comprises a housing, a pump provided in the housing and rotatable about a predetermined axis, means for rotating the pump, a turbine installed in the housing between a wall of the housing and the pump (as considered in the direction of the pump axis), and an engageable and disengageable lockup clutch which is provided in the housing and operates between the housing and the turbine. The clutch has at least one friction lining and comprises a conduit for delivery of a flowable coolant to the at least one friction lining. At least a portion of such at least one conduit can extend in the housing in at least substantial parallelism with the axis of the pump. Furthermore, the at least one conduit can extend through the turbine, and the housing can be provided with two compartments which are at least partially separated from each other by the turbine; the at least one conduit then provides a path for the flow of coolant between the two compartments. One of the compartments can be provided at the core of the torus which is defined by the pump and the turbine, and the at least one friction lining of the clutch can be disposed in the one compartment.

Another feature of the invention resides in the provision of a hydrokinetic torque converter which comprises a housing, a pump provided in the housing and rotatable about a predetermined axis, means for rotating the pump, a rotary turbine provided in the housing between a wall of the housing and the pump (as seen in the direction of the pump axis), and a lockup clutch installed in the housing between the wall and the turbine. The turbine includes a shell having a portion remote from the axis of the pump, and the clutch has at least one friction lining which is carried by such portion of the shell.

The just outlined torque converter can further comprise a carrier element provided on the portion of the shell, and the at least one friction lining can be provided on the carrier element. The aforementioned portion of the shell can constitute or include a plane portion extending substantially or exactly radially of the axis of the pump, or such portion of the shell can have a conical shape. The shell of the turbine can be of one piece, i.e., the aforementioned portion can be of one piece with the other part or parts of the shell. Alternatively, the aforementioned portion of the shell can comprise a plurality of discrete parts, and the turbine then further comprises means for fastening such discrete parts to the main portion of the shell.

In accordance with another embodiment of the invention, the improved hydrokinetic torque converter can comprise a housing, a pump provided in the housing and being rotatable about a predetermined axis, means for rotating the pump, a rotary turbine provided in the housing between the pump and a wall of the housing, and a lockup clutch installed in the housing and including an at least substantially circular carrier element provided on the shell of the turbine. The carrier element is provided with at least one friction lining which forms part of the lockup clutch.

The carrier element can constitute a plane element extending at least substantially radially of the axis of the pump; alternatively, the carrier element can have a conical shape. The lockup clutch can comprise means for non-rotatably connecting the carrier element to the shell of the turbine. Still further, the lockup clutch can comprise means for tiltably mounting the carrier element on the shell of the turbine.

Another embodiment of the improved hydrokinetic torque converter comprises a housing, a pump provided in the housing and being rotatable about a predetermined axis, a rotary turbine provided in the housing between a wall of the housing and the pump (as seen in the direction of the pump axis), and a lockup clutch provided in the housing and comprising an at least substantially circular carrier element having at least one friction surface. The element has a radially inner portion which rotates with the turbine.

The turbine can have a hub which is adjacent the axis of the pump, and the radially inner portion of the carrier element is or can be mounted for rotation with such hub. The carrier element can further include an at least substantially plane radially outer portion which carries the at least one friction surface and extends at least substantially radially of the axis of the pump. Alternatively, the radially outer portion of the carrier element, namely the portion which supports the at least one friction surface, can have a substantially conical shape.

Still another embodiment of the improved hydrokinetic torque converter can comprise a housing, a pump provided in the housing and being rotatable about a predetermined axis, means for rotating the pump, a rotary turbine provided in the housing between a wall of the housing and the pump (as seen in the direction of the axis of the pump), and a lockup clutch installed in the housing and including a plurality of complementary friction surfaces. At least one of these surfaces is or can be supported by the aforementioned wall of the housing.

The at least one friction surface can be provided on a substantially circular carrier element which is directly affixed to the wall of the housing. Alternatively, the substantially circular carrier element can be installed on the wall of the housing through the intermediary of a torsional vibration damper, i.e., such damper is interposed between the wall of the housing and the carrier element. The at least one friction surface can be provided on a plane portion of the circular carrier element, i.e., on a portion which extends substantially radially of the axis of the pump. Alternatively, the at least one friction surface can be provided on a conical portion of the at least substantially circular carrier element. The carrier element can be non-rotatably supported by the wall of the housing. However, it is equally within the purview of the invention to provide the at least one friction surface on a carrier element which is secured to the wall of the housing with limited freedom of angular movement in the circumferential direction of the housing. One or more springs or other suitable means can be provided to bias the carrier element in the circumferential direction of the housing.

In accordance with still another embodiment, the improved hydrokinetic torque converter comprises a housing, a pump in the housing, a rotary turbine in the housing, an input member, an output member, and a torsional vibration damper operating between the input and output members. The pump and the turbine define the core of a torus, and the damper is located a the core of the torus.

The lockup clutch in the housing of such torque converter can operate in parallel or in series with the damper.

In accordance with an additional embodiment of the invention, the improved hydrokinetic torque converter comprises a housing, a pump disposed in the housing, a turbine disposed in the housing and defining with the pump the core of a torus, a lockup clutch installed in the housing an including an input member, and a torsional vibration damper provided in the housing at the core of the torus between the input member and the pump.

Alternatively, the torque converter can comprise a housing, a pump in the housing, a turbine provided in the housing and defining with the pump the core of a torus, a lockup clutch installed in the housing and having an output member, and a torsional vibration damper provided in the housing at the core of the torus and operating between the output member of the clutch and the turbine.

In accordance with still another embodiment of the invention, the improved hydrokinetic torque converter comprises a rotary housing, a turbine provided in the housing and being rotatable about a predetermined axis, a lockup clutch provided in the housing and being operable to establish a path for the transmission of torque between the housing and the turbine, and a torsional vibration damper installed in the path between a wall of the housing and the turbine. The damper has an output element which is operatively connected with a hub of the turbine.

The improved torque converter can comprise a housing which is rotatable about a predetermined axis, a turbine which is rotatable in the housing about the aforementioned axis, a rotary output member in the housing, and at least one torsional vibration damper which is interposed in a torque transmitting path between the turbine and the output member. The turbine of such torque converter can comprise a first portion and a hub forming part of the output member, and the at least one damper can operate between the first portion and the hub of such turbine.

In accordance with an additional feature of the invention, the improved hydrokinetic torque converter comprises a housing which is rotatable about a predetermined axis, a turbine which includes a shell and is rotatable in the housing about the aforementioned axis, at least one torsional vibration damper disposed in the housing between the shell and a wall of the housing (as seen in the direction of the aforementioned axis), and a lockup clutch which is installed in the housing and has a plurality of complementary friction surfaces. The lockup clutch includes at least one carrier element for at least one of the friction surfaces, and the damper operates in a power flow between the wall of the housing and the at least one carrier element.

It is also possible to construct and assemble the improved hydrokinetic torque converter in such a way that it comprises a housing which is rotatable about a predetermined axis, a rotary turbine provided in the housing and being movable therein in the direction of the aforementioned axis, and a lockup clutch installed in the housing and including at least one friction lining which is borne by the turbine. The clutch further includes a friction surface which is supported by the housing and is engageable by the at least one friction lining in response to axial movement of the turbine relative to the housing.

The structure including the just outlined torque converter further comprises a prime mover for the housing. The latter has a wall which is adjacent the prime mover, and the friction surface of the clutch is or can be located at such wall. The at least one friction lining can be supported by an at least substantially circular portion of a shell forming part of the turbine. The at least substantially circular portion of the shell can constitute a substantially plane section extending at least substantially at right angles to the axis of the housing, or such portion of the shell can have a conical shape. The at least one friction lining can be provided directly on the at least substantially circular portion of the shell; alternatively, the torque converter can further comprise a carrier element which is interposed between the at least one friction lining and the at least substantially circular portion of the shell. Such at least substantially circular portion can include at least one lamina.

In accordance with still another feature of the invention, the improved hydrokinetic torque converter can comprise a housing which is rotatable about a predetermined axis, means for rotating the housing including an output element outwardly adjacent a wall of the housing, and a lockup clutch disposed in the housing and having a plurality of complementary friction surfaces. The clutch comprises an at least substantially circular elastic carrier element which establishes a flexible connection between the wall and the friction surface.

The carrier element can contain or consist of a synthetic plastic material, e.g., a thermosetting material.

It is also possible to construct and assemble the improved hydrokinetic torque converter in such a way that it comprises a housing which is rotatable about a predetermined axis, means for rotating the housing including an output element outwardly adjacent a wall of the housing, and a lockup clutch installed in the housing and including a friction surface on the wall of the housing.

Such design also contributes to compactness of the torque converter in the axial direction of the housing. The friction surface can be a plane friction surface extending at least substantially at right angles to the axis of the housing, or at least a portion of the friction surface can have a conical shape.

The improved hydrokinetic torque converter can comprise a housing which is rotatable about a predetermined axis, means for rotating the housing, a turbine which is rotatable in the housing about the aforementioned axis and includes a shell, a lockup clutch provided in the housing and having a friction surface disposed on a lamina, and an at least substantially circular elastic carrier element disposed in a socket of the shell to establish on the shell a flexible support for the lamina. The lamina can have an at least substantially plane shape or it can constitute a hollow conical body.

It is also possible to construct and assemble the improved hydrokinetic torque converter in such a way that it comprises a rotary housing, an output member in the housing, and a torsional vibration damper provided in the housing in a power flow between the housing and the output member. The damper comprises at least two elements which are rotatable with and relative to each other, and energy storing means operating between the at least two elements. The energy storing means can comprise at least one compression spring, such as a coil spring.

In accordance with another presently preferred embodiment, the improved hydrokinetic torque converter comprises a housing which is rotatable about a predetermined axis, a rotary turbine in the housing, a lockup clutch in the housing, and a torsional vibration damper having two rotary components provided in the housing and being turnable relative to each other about the aforementioned axis. The damper further comprises first ramps provided on one of the components, second ramps complementary to the first ramps and provided on the other component, and spheres or other suitable rolling elements interposed in a power flow between the first ramps and the complementary second ramps. The ramps can be of one piece with the respective components; alternatively, the ramps can constitute separately produced parts which are non-rotatably affixed to the respective components.

The improved hydrokinetic torque converter can also be constructed and assembled in such a way that it comprises a rotary housing, means for rotating the housing including a combustion engine having a nominal torque, and a torsional vibration damper provided in the housing and serving to transmit a maximum torque which is less than or at most approximates or equals the nominal torque.

Still further, the improved hydrokinetic torque converter can comprise a housing which is rotatable about a predetermined axis, and a turbine which is rotatable in the housing about the predetermined axis and has a hub disposed at the axis. The hub is fixed in a predetermined position (as considered in the direction of the predetermined axis), and the turbine further comprises a second portion and means for axially movably connecting the second portion to the hub.

The means for connecting can comprise an element which is flexible in the direction of the predetermined axis. Such element can comprise one or more leaf springs and/or one or more torsion springs.

The novel features which are considered as characteristic of the invention are set forth in particular in the appended claims. The improved hydrokinetic torque converter itself, however, both as to its construction, the mode of assembling the same and its mode of operation, together with numerous additional features and advantages thereof, will be best understood upon perusal of the following detailed description of certain presently preferred specific embodiments with reference to the accompanying drawings.

BRIEF DESCRIPTION OF THE DRAWINGS

FIG. 7 is a fragmentary axial sectional view of a torque converter constituting a modification of the torque converter of FIG. 6;

FIG. 8 is a fragmentary axial sectional view of a torque converter constituting a modification of the structure shown in FIG. 7;

FIG. 15a is a fragmentary axial sectional view of still another torque converter;

FIG. 15b is a similar view of a further torque converter;

FIG. 15c is a similar view of still another torque converter;

FIG. 15d is a similar view of a further torque converter;

FIG. 15e is a similar view of still another torque converter;

FIG. 15f is a similar view of an additional torque converter;

FIG. 16b is a diagram showing the resistances encountered by a stream of fluid coolant during flow through the lockup clutch of FIG. 16a;

FIG. 16c is a fragmentary plan view of a friction lining which can-be utilized in the lockup clutch of the improved torque converter, for example, in the lockup clutch of FIG. 16a;

FIG. 17a is a fragmentary axial sectional view of a lockup clutch constituting a modification of the clutch shown in FIG. 16a;

FIG. 17b is a fragmentary plan view of a friction lining which can be utilized in the lockup clutch of FIG. 17a;

FIG. 18a is a fragmentary axial sectional view of a lockup clutch constituting another modification of the clutch shown in FIG. 16a;

FIG. 18b is a fragmentary plan view of portions of three different friction linings which can be used in the clutch of FIG. 18a;

DESCRIPTION OF PREFERRED EMBODIMENTS

Figure 1:
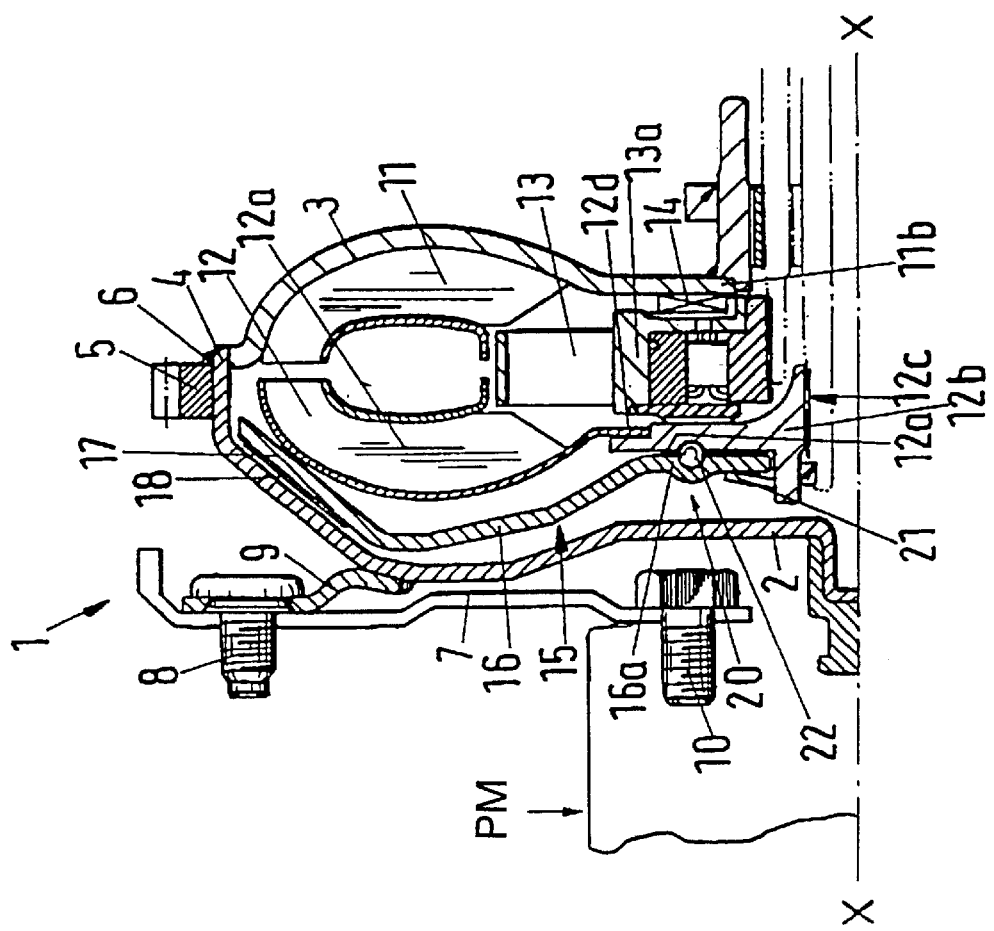
FIG. 1 is a fragmentary axial sectional view of a hydrokinetic torque converter which embodies one form of the invention and wherein the lockup clutch comprises a piston for a conical friction lining.

FIG. 1 illustrates, in an axial sectional view, approximately one-half of a hydrokinetic torque converter 1 embodying one form of the present invention. The improved torque converter 1 comprises a rotary housing 2 including two walls 3, 4 having their radially outermost portions welded, soldered and/or otherwise reliably and sealingly secured to each other. The left-hand wall 4 of the housing 2 is adjacent a substantially disc-shaped output element 7 forming part of or affixed (as by fasteners 10) to a crankshaft or camshaft of a prime mover PM, such as the combustion engine of a motor vehicle.

The radially outermost part of the wall 4 is surrounded by a gear 5 which can serve as a starter gear and is welded (as at 6) and/or otherwise reliably secured to the housing 2. It is also possible to design the wall 4 of the housing 2 in such a way that it is of one piece with the gear 5. In addition to or in lieu of serving as a starter gear, the part 5 can also constitute or form an element of or an entire transmitter for the controls of the engine.

The wall 4 of the housing 2 carries a suitably configurated coupling element 9 which is separably secured to the radially outer portion of the output element 7 by screws, bolts and/or other suitable fasteners 8. The fasteners 10 connect the radially inner portion of the output element 7 with the prime mover, e.g., with the crankshaft or camshaft of the engine PM in a motor vehicle. The illustrated output element 7 is a washer-like structure which is flexible in the direction of the central axis X—X of the torque converter 1.

The housing 2 contains and transmits torque to an impeller or pump 11 (hereinafter called pump) which is adjacent a rotary runner or turbine 12 (hereinafter called turbine). The torque converter 1 of FIG. 1 further comprises an optional stator 13 which is installed between the pump 11 and the turbine 12. The wall 3 of the illustrated housing 2 forms an integral part of the pump 11 and is of one piece with the vanes or blades of the pump. Thus, when the housing 2 is properly assembled, it is already equipped with and can rotate the pump 11 about the axis X—X.

The turbine 12 includes a shell which carries a set or vanes or blades 12a confronting the vanes or blades of the pump 11, and the turbine further comprises a hub 12b having a radially inner portion 12c which transmits torque to the input element of a transmission (such as the shaft 107 shown in FIG. 7). The connection between the shell and the hub 12b of the turbine 12 is shown at 12d; such connection can include or constitute a welded or soldered joint.

A thrust bearing 14 is installed between the hub 11b of the pump 11 and the hub 13a of the stator 13, as seen in the direction of the axis X—X The torque converter 1 further comprises a lockup or bypass clutch 15 which is installed in the housing 2 between the wall 4 and the turbine 12. The clutch 15 can constitute a separately produced part which is installed in the housing 2, or at least certain of its parts can constitute or include elements of the torque converter in the region of the wall 4. The clutch 15 of FIG. 1 comprises a piston 16 having a radially outer portion 17 which carries a friction lining 18 of the clutch and a radially inner portion forming part of or adjacent a torsional vibration damper 20.

The damper 20 of FIG. 1 is constructed, assembled and installed in such a way that it causes the radially inner portion of the piston 16 of the lockup clutch 15 to bear against the hub 12b of the turbine 12. To this end, the damper 20 comprises one or more energy storing elements 21 (such as diaphragm springs) which urge the radially inner portion of the piston 16 to bear against the left-hand side of the hub 12b. As can be readily seen in FIG. 1, the radially inner portion of the annular washer-like piston 16 is substantially plane or flat, i.e., it extends at least substantially radially of the axis X—X, and abuts the similarly oriented plane or flat part 12a of the hub 12b. The radially inner portion 16a of piston 16 and the portion 12a of the hub 12b are provided with sets of confronting inclined surfaces or ramps (not identified by reference characters), and each ramp of the piston 16 cooperates with the confronting ramp of the portion 12a to confine one of a set of rolling elements 22 (e.g., spheres). This ensures that, if the angular position of the piston 16 relative to the turbine 12 is changed, the axial position of the piston relative to the housing 2 and the turbine 12 also changes, and such change in the axial position of the piston 16 takes place against the opposition of the energy storing means 21 of the torsional vibration damper 20. The friction lining 18 on the radially outer portion 17 of the piston 16 is then caused to bear against the adjacent friction surface of the wall 4 with a greater force and the magnitude of the torque being transmitted from the wall 4 directly to the hub 12b of the turbine 12 is increased accordingly.

Figure 2:
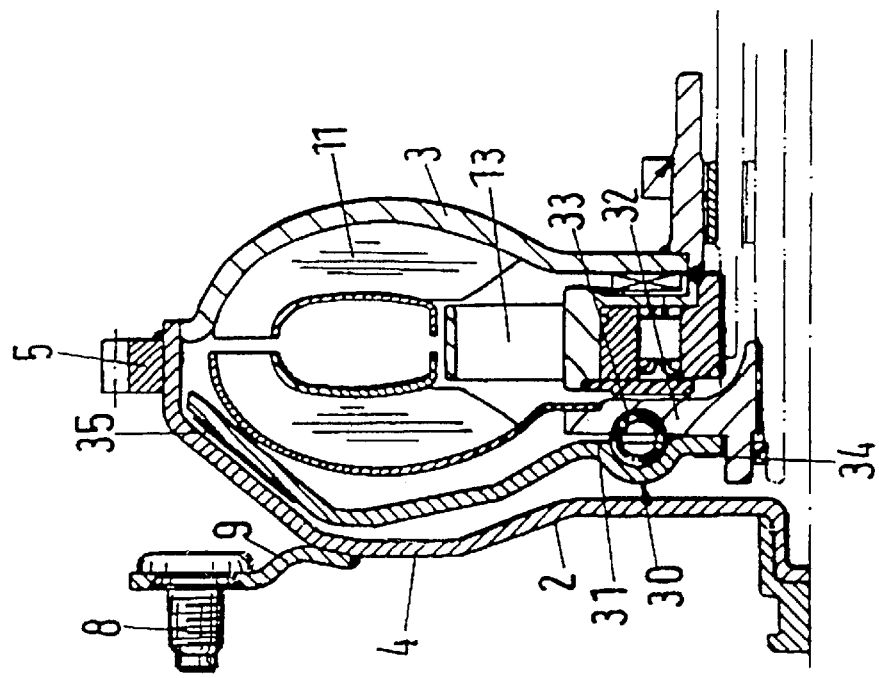
FIG. 2 is a similar fragmentary axial sectional view of a torque converter employing a modified torsional vibration damper.

FIG. 2 shows a portion of a somewhat modified hydrokinetic torque converter. Those parts of this modified torque converter which are identical with or clearly analogous to the corresponding parts of the torque converter 1 are denoted by similar reference characters. The lockup clutch of FIG. 2 employs a slightly different piston 31 having a conical radially outer portion (similar to or identical with the radially outer portion 17 of the piston 16) which supports a friction lining 35 adjacent a conical friction surface at the inner side of the radially outer portion of the wall 4.

The torsional vibration damper 30 in the housing 2 of the torque converter of FIG. 2 includes the radially inner portion of the piston 31, the adjacent hub, of the turbine 32, energy storing elements 33 (e.g., compression coil springs) between the piston 31 and the turbine 32, and an annular clamping or retaining element 34 (e.g., a split ring) which holds the radially inner portion of the piston 31 against movement axially and away from the adjacent hub of the turbine 32. The springs 33 are received in recesses or pockets which are provided in the adjacent portions of the piston 31 and turbine 32. In the torque converter of FIG. 2, the configuration of the pockets is such that each of the springs 33 includes a first half recessed into the radially inner portion of the piston 31 and a second half recessed into the adjacent portion of the turbine 32.

It is preferred to employ a plurality of arcuate energy storing elements 33, e.g., two elongated coil springs each of which can extend along an arc of close to 180°. The purpose of the annular clamping or retaining element 34 is to permit the piston 31 and the turbine 32 to turn relative to each other about the axis of the housing 2 but to hold the radially inner portion of the piston 31 against axial movement (or against excessive axial movement) away from the hub of the turbine 32.

The magnitude of the torque being transmitted by the lockup clutch including the piston 31 depends on the force with which the friction lining 35 bears against the adjacent friction surface of the wall 4.

Figure 3:
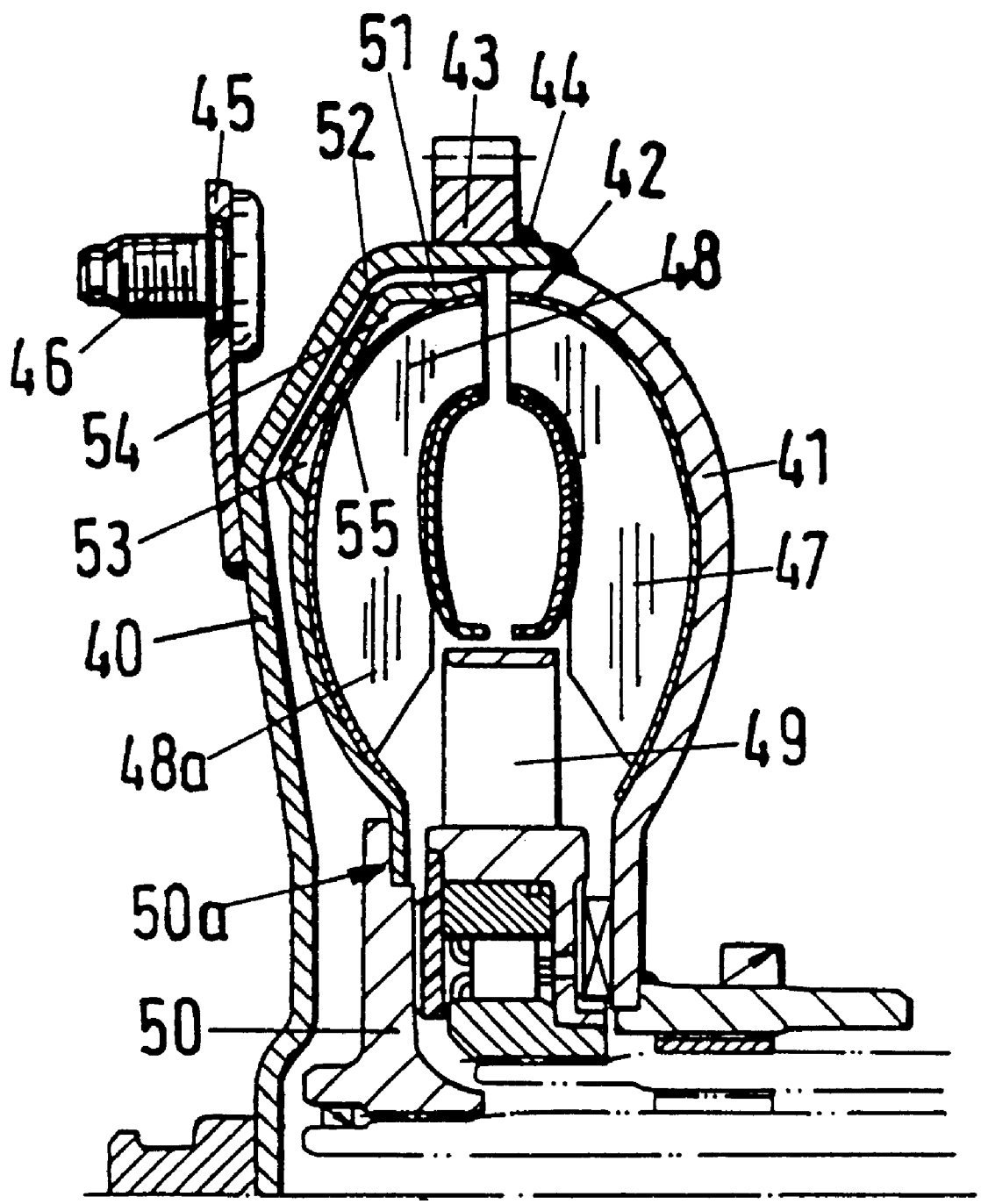
FIG. 3 is a fragmentary axial sectional view of a torque converter which does not employ a torsional vibration damper.

FIG. 3 shows a portion of a hydrokinetic torque converter which does not employ a torsional vibration damper. The housing of this torque converter comprises a first wall 40 adjacent and a second wall 41 remote from the output element of the prime mover (e.g., a washer-like flexible part corresponding to the part 7 shown in FIG. 1). The reference character 42 denotes a welded or soldered joint serving to sealingly and non-rotatably couple the radially outermost portions of the walls 40 and 41 to each other. The radially outermost part of the wall 40 carries a ring-shaped gear 43 (e.g., a starter gear) which is welded or soldered to the housing, as at 44.

The means for transmitting torque to the housing of the torque converter of FIG. 3, i.e., to the pump 47 including the wall 41, includes a flexible coupling device 45 which is fastened to the wall 40, and fasteners 46 which secure the device 45 to an output element (such as the output element 7 shown in FIG. 1).

In addition to the pump 47, the housing including the walls 40, 41 confines a turbine 48 and an optional stator 49 between the pump and the turbine. The hub 50 of the turbine 48 constitutes the output member of the torque converter; this hub is movable in the axial direction of the housing to thus select the magnitude of the torque being transmitted by the lockup clutch including a friction lining 52 on a conical radially outer portion of a shell 51 forming part of the turbine 48 and carrying a set of vanes or blades 48a. The connection between the radially inner portion of the shell 51 and the hub 50 of the turbine 48 is shown at 50a.

The conical radially outer portion of the shell 51 can be replaced with a plane or flat portion which extends at least substantially radially of the axis of the housing including the walls 40 and 41. The inclination of the friction surface on the adjacent radially outer portion of the wall 40 is then changed accordingly.

The configuration of the vanes or blades 48a forming part of the turbine 48 and carried by the shell 51 is such that these vanes or blades cannot interfere with the desirable circulation of fluid at the locations 53 and 54, i.e., in the region (55) of the lockup clutch including the friction lining 52. This is accomplished by causing the vanes or blades 48a to establish an at least substantial sealing action at 53 and 54, i.e., in the region 55 of the lockup clutch.

Figure 3A:
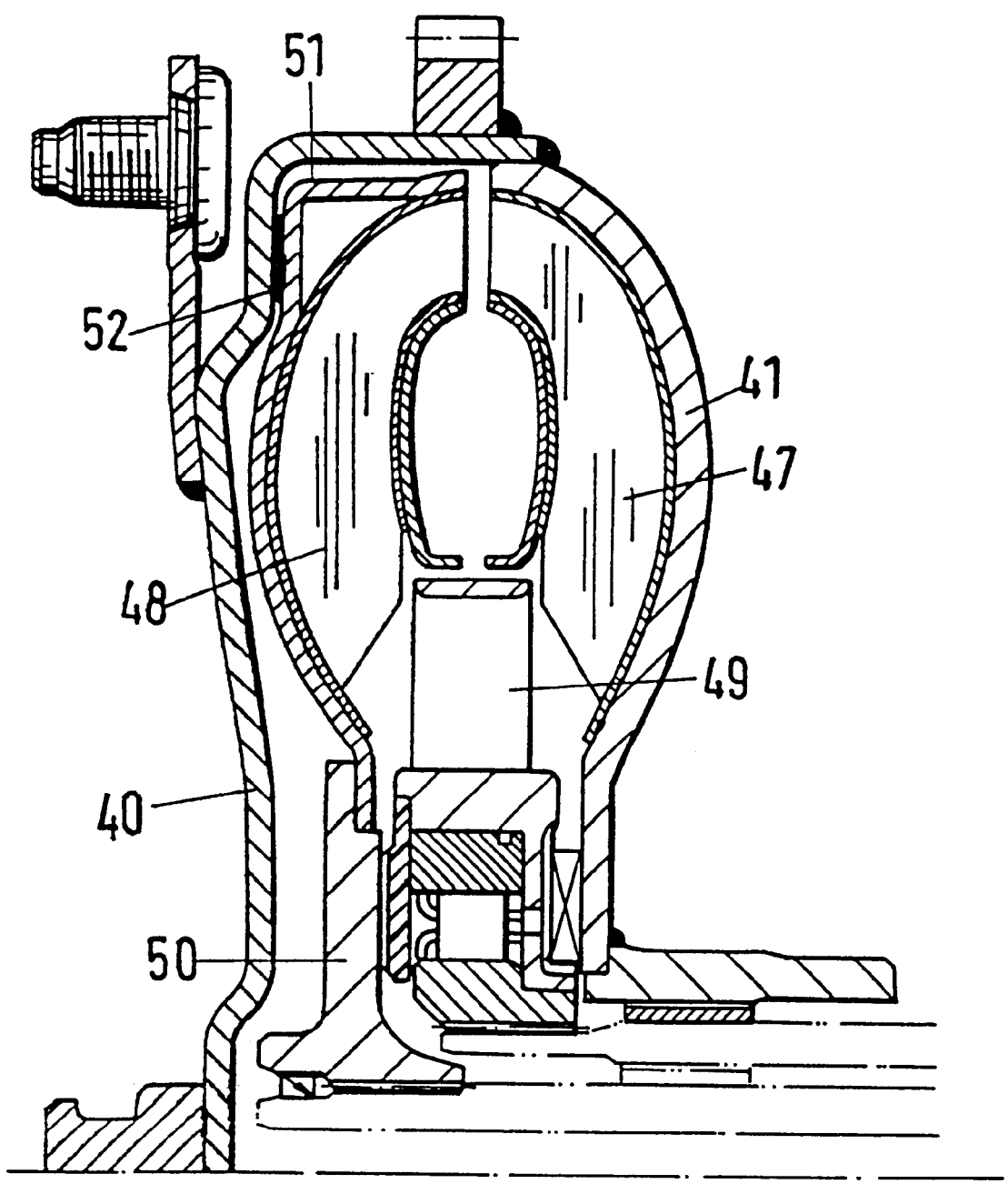
FIG. 3a is a fragmentary axial sectional view of a torque converter having a lockup clutch with a radially extending friction lining on the shell of the turbine.

The hydrokinetic torque converter of FIG. 3a constitutes a modification of the torque converter which is shown in FIG. 3 The only major difference is that the radially outer portion of the shell 51 forming part of the turbine 48 shown in FIG. 3a includes a plane or flat part extending radially of the axis of the pump 47 and carrying a radially extending friction surface or friction lining 52 engageable with a complementary radially extending friction lining or friction surface on the adjacent radially outer portion of the wall 40. In all other respects, the torque converter of FIG. 3a is or can be identical with the torque converter of FIG. 3.

The stator 49 of FIG. 3a is mounted on a non-referenced shaft, and the hub 50 of the turbine 48 transmits torque to the input element or component or member of a transmission (refer again to the shaft 107 shown in FIG. 7).

Figure 4:
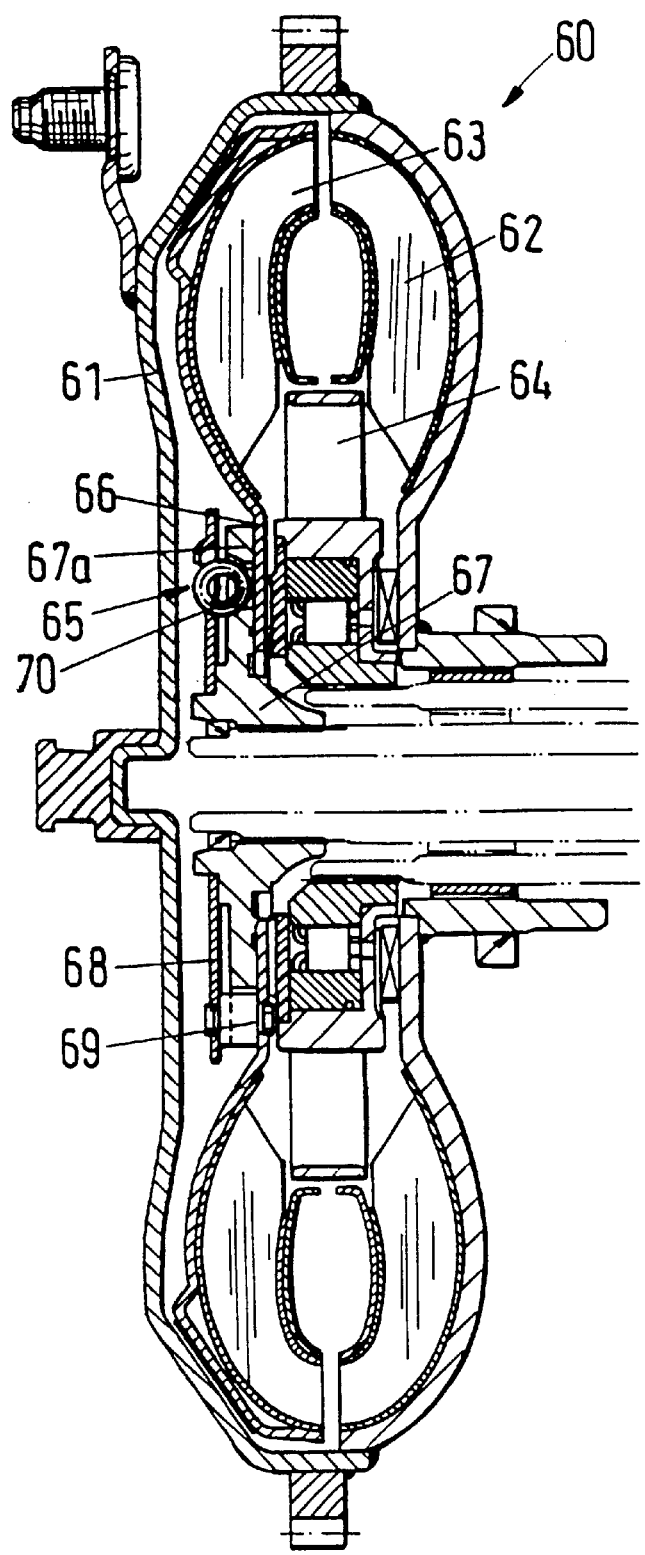
FIG. 4 is an axial sectional view of a fourth torque converter.

FIG. 4 illustrates a hydrokinetic torque converter 60 having a housing 61-for a pump 62, a turbine 63 and a stator 64. These parts are similar to, and can be identical with, the corresponding parts of the torque converter which is illustrated in FIG. 3.

The torsional vibration damper 65 of the hydrokinetic torque converter 60 of FIG. 4 operates between an annular washer-like component 68, which is affixed to the shell 66 of the turbine 63, and a hub 67 of the turbine. The damper 65 further comprises energy storing elements 70 in the form of arcuate compression coil springs which oppose rotation of the component 68 (i.e., of the shell 66) relative to the hub 67 of the turbine 63. In other words, the shell 66 is not compelled to share all angular movements of the hub 67 and vice versa. The radially outer portion of the hub 67 is provided with an annular axially extending projection or flange 67a which is disposed between the radially outer portion of the component 68 (radially outwardly of the energy storing elements 70) and the radially inner portion of the shell 66. The flange 67a can be mounted in such a way that it is turnable relative to the component 68 and/or the shell 66. FIG. 4 shows that the component 68 is non-rotatably secured to the shell 66 by rivets 69; however, other fasteners can be employed with equal or similar advantage.

Figure 5:
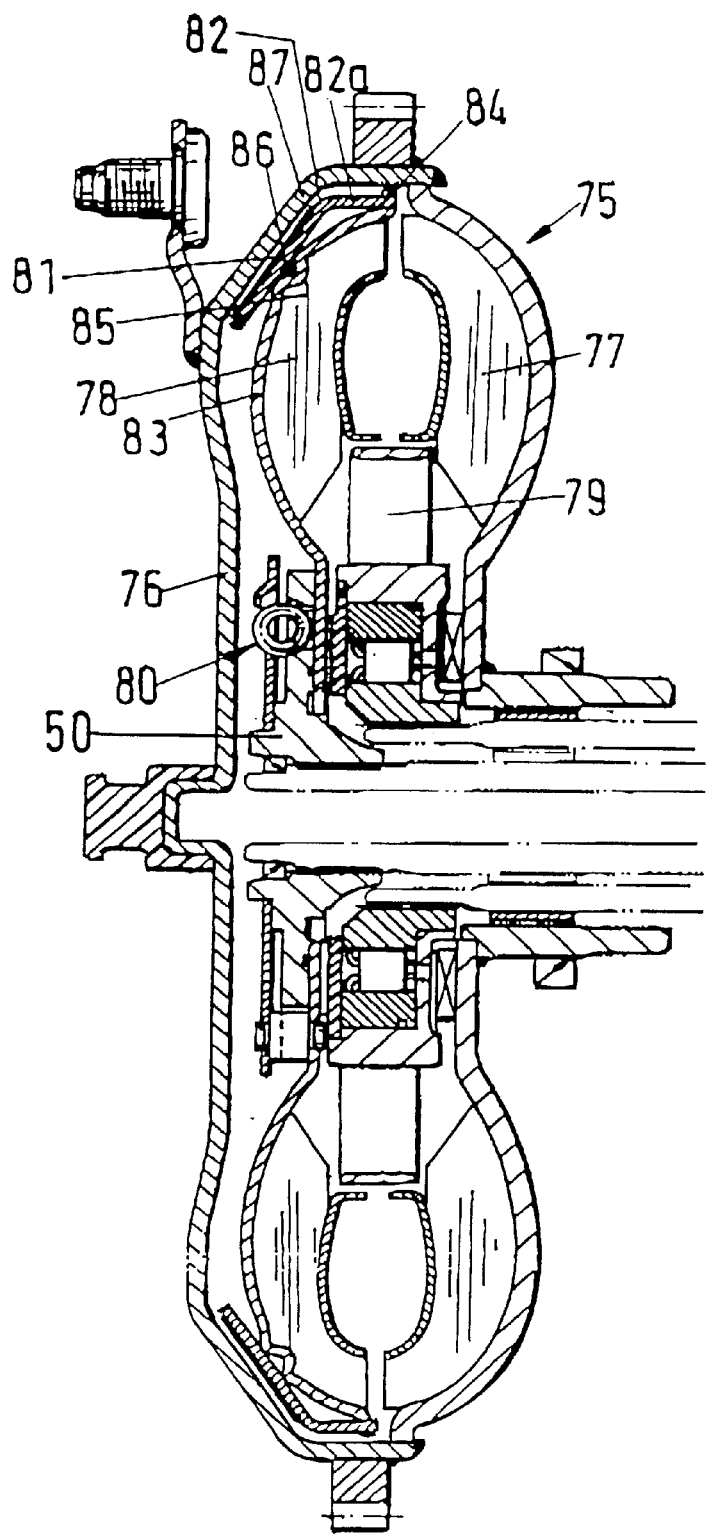
FIG. 5 is an axial sectional view of a torque converter wherein the friction lining of the lockup clutch is tiltably mounted on the shell of the turbine in the housing of the torque converter.

The hydrokinetic torque converter 75 of FIG. 5 comprises a housing 76 for a pump 77, a turbine 78 and a stator 79. The torsional vibration damper 80 in the housing 76 is similar to the damper 65 of FIG. 4. The lockup clutch 81 of FIG. 5 comprises an annular carrier of lamina 82 having a friction surface which constitutes the frustum of a hollow cone and the lamina is non-rotatably secured o the shell 83 of the turbine 78. The connection between the lamina 82 and the turbine 78 is established at the radially outer portion of the shell 83 and can include complementary interengaged male and female detent elements including studs, plugs or lugs and sockets or the like. The illustrated frustoconical lamina 82 can be replaced with a flat washer-like lamina without departing from the spirit of the invention; its radially outermost portion is provided with arms 82a which engage the radially outer portion 84 of the shell 83.

An intermediate portion of the lamina 82 (as seen in the radial direction of the housing 76) abuts a resilient or at least partially resilient element or insert 86 in a socket 85 of the shell 83. The socket 85 is located at least substantially midway between the radially innermost and radially outermost portions of the friction lining or friction surface on the lamina 82. The insert 86 can be made of a synthetic plastic material, such as a thermosetting resin, an elastomer or any other substance which provides an elastic cushion between the lamina 82 (i.e., the carrier element for the friction lining or friction surface) and the shell 83 of the turbine 78. The hub 50 is movable in the axial direction of the housing thus to select the magnitude of the torque being transmitted by the lockup clutch 81.

The element or insert 86 provides a tiltable seat for the lamina 82 and its friction lining or friction surface. Such mounting of the lamina 82 on the shell 83 invariably ensures an optimum distribution of pressures between the friction lining or friction surface of the lamina 82 and the adjacent confronting friction lining or friction surface 87 on the adjacent conical portion of the left-hand wall of the housing 76. The tiltability of the lamina 82 relative to the shell 83 need not be pronounced; all that counts is to ensure the establishment of satisfactory large-area contact between the friction lining or friction surface of the lamina and the friction lining or friction surface 87 when the lockup clutch 81 is engaged. In other words, one of these friction linings or surfaces should be capable of conforming to the other friction lining or friction surface when the clutch 81 is called upon to transmit torque between the housing 76 and the lamina 82 which, in turn, transmits torque to the shell 83.

Figure 6:
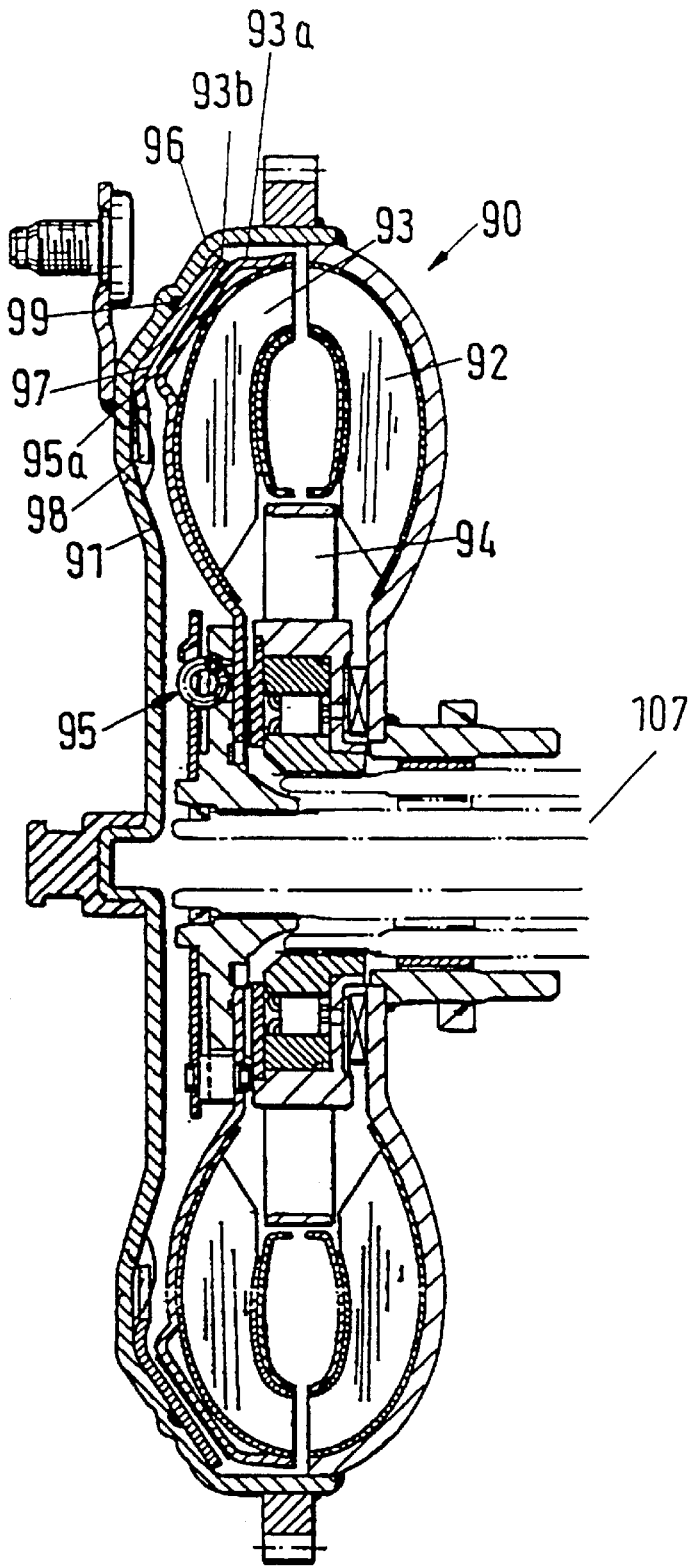
FIG. 6 is an axial sectional view of a torque converter wherein a friction lining of the lockup clutch is pivotably or tiltably mounted in the housing of the torque converter.

FIG. 6 shows a hydrokinetic torque converter 90 having a housing 91 for a pump 92, a turbine 93 which can transmit torque to a coaxial output element 107 (such as the input shaft of a transmission), and a stator 94. A torsional vibration damper 95 in the housing 91 is or can be identical with or analogous to the damper 65 in the torque converter 60 of FIG. 4. The shell 93a of the turbine 93 comprises a conical portion 93b and is provided with a friction lining or friction surface 95a (hereinafter called lining) forming part of the lockup clutch. A complementary friction lining or friction surface 96 is provided on a lamina 97 which is non-rotatably secured to the adjacent wall of the housing 91, as at 98. A tiltable element here shown as an annular seat 99 is provided for the lamina 97 radially midway between the innermost and outermost portions of the lining or surface 96 on the conical radially outer portion of the housing 91 to the left of the conical portion 93b of the shell 93a, as viewed in FIG. 6. The advantage of tiltable mounting of the lamina 97 at 99 is the same as that described in connection with the seat including the part 85 and the resilient element 86 in the torque converter 75 of FIG. 5.

The conical lamina 97 can be replaced with a plane or flat lamina; this would necessitate a change in the shape of that portion of the housing 91 which supports the lining or surface 96.

Referring to FIG. 7, there is shown a hydrokinetic torque converter 100 having a rotary housing 101 for a pump 102, a turbine 103 and a stator 104 (this stator is optional). A hub 105 of the turbine 103 constitutes the output member of the torque converter 100 and has internal axially parallel teeth 106 extending into axially parallel peripheral flutes of the aforementioned member 107 constituting, for example, the rotary input element or component of a transmission in a motor vehicle. A lockup clutch 108 of the torque converter 100 has a first friction lining or friction surface on a conical portion 109 of the shell 110 of the turbine 103. For example, the conical portion 109 of the shell 110 can carry a suitable friction lining which is bonded thereto in a manner not forming part of the present invention. It goes without saying that the conical portion 109 can be replaced with a plane or flat portion of the shell 110; this would necessitate a replacement of the conical lamina 112 for the complementary friction surface or friction lining 111 of the lockup clutch 108 with a flat washer-like lamina.

The lamina 112 is secured to the left-hand wall of the housing 101 by a damper 113. The illustrated damper comprises two at least substantially circular carrier elements 114, 115 each of which is provided with an annulus of ramps (not referenced in FIG. 7). The ramps on the carrier element 114 confront and are complementary to the ramps on the carrier element 115, and the damper 113 further comprises rolling elements (e.g., spheres) between the ramps of the element 114 and the complementary ramps of the element 115. The ramps can be of one piece with or they can form separately produced parts which are affixed to the respective carrier elements.

The carrier element 114 is affixed to the housing 101 by suitable fasteners, such as by standard rivets 116 or blind rivets, and the carrier element 115 is non-rotatably affixed to the lamina 112 which carries the friction lining or friction surface 111. When the carrier elements 114, 115 are caused to turn relative to each other, the rolling elements between their ramps cause such carrier elements to move axially and away from each other, or the rolling elements cooperate with the respective sets of ramps to permit the carrier elements 114, 115 to move axially and nearer to each other. Such axial movements of the carrier elements 114, 115 establish the circumstances for the transmission of larger or smaller torques between the lamina 112 and the portion 109 of the shell 110 of the turbine 103. Otherwise stated, the damper 113 can be set to permit a more or less pronounced slip between the lamina 112 and the shell 110, i.e., the torsional damping action can be varied within a desired range.

The torque converter 100 further comprises resilient means 117 (e.g., a suitably configured segment) for biasing the lamina 112 toward the adjacent portion 109 of the shell 110. This ensures that the two sets of ramps on the carrier elements 114, 115 always engage the rolling elements between the the resilient means 117 can be non-rotatably affixed to the housing 101. The arrangement is preferably such that the resilient means 117 prevents any and all undesirable axial (e.g., tilting) and/or circumferential movements of the lamina 112 in order to ensure uninterrupted satisfactory engagement between the ramps and the rolling elements of the torsional vibration damper 113.

FIG. 8 shows a hydrokinetic torque converter 120 having a rotary housing 121 for a pump 122, a turbine 123 and a stator 124. The friction surface or friction lining 125 on the conical radially outer portion of the shell 126 of the turbine 123 is or can be identical with that on the conical portion 109 of the shell 110 which is shown in FIG. 7. A complementary friction surface or friction lining 127 is provided on a conical lamina 128 which is secured to the wall 131 of the housing 121 by a torsional vibration damper 130. The latter extends in a circumferential direction of the wall 131 and comprises energy storing elements 132. Furthermore, the damper 130 comprises rolling elements 133 which take up axial forces. This damper does not comprise ramps and complementary ramps of the type described with reference to FIG. 7, i.e., the rolling elements 133 operate directly between two confronting parts 134 and 135.

The damper 130 can constitute a so-called full load damper capable of transmitting a maximum torque which matches or at least approximates the nominal torque of the engine (not shown) serving to drive the housing 121 and the pump 122. The energy storing elements 132 are caused to store energy for to store additional energy) when the parts 134, 135 are caused to change their angular positions relative to each other. At the same time, the rolling elements 133 take up axial forces between the parts 134 and 135.

Figure 9:
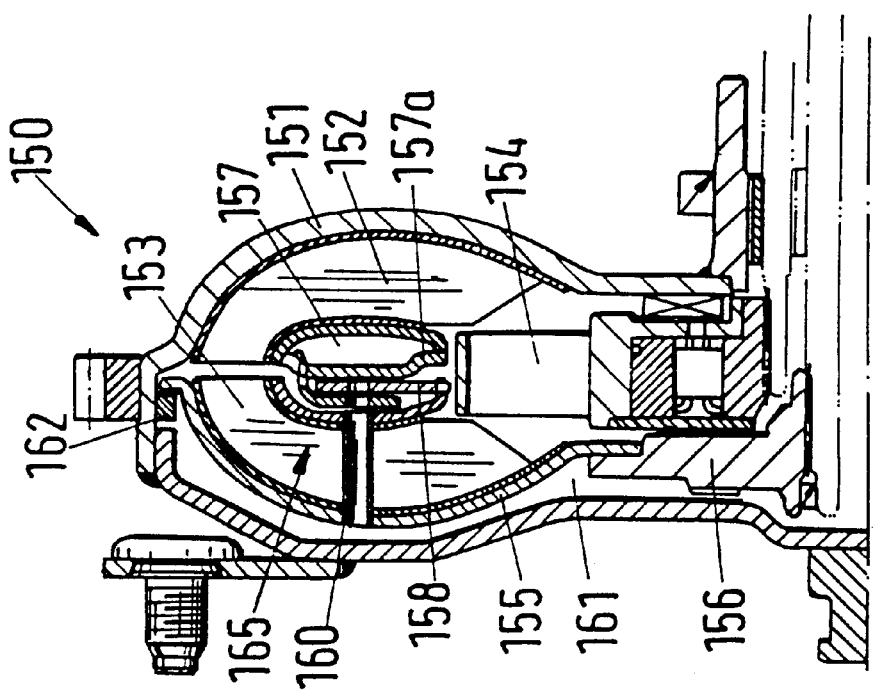
FIG. 9 is a fragmentary axial sectional view of a torque converter wherein the lockup clutch is confined in the housing between the pump, turbine and stator of the torque converter and wherein the lockup clutch is conditioned by one or more streams of a coolant.

The hydrokinetic torque converter 150 of FIG. 9 comprises a rotary housing 151 for a pump 152, a turbine 153 and a stator 154. A shell 155 of the turbine 153 is non-rotatably affixed to the hub 156 of the turbine. This hub constitutes the output member of the torque converter 150.

The pump 152, the turbine 153 and the stator 154 together define a torus having a core 157 in or at the center of the husing 151, and this core defines a compartment for a lockup clutch 165 which is designed to establish (when engaged) a torque transmitting connection between the pump 152 and the turbine 153 in response to appropriate axial displacement of the turbine relative to the housing 151.

The lockup clutch 165 comprises laminae 157a which are affixed to the pump 152, and laminae 158 which are secured to the turbine 153. The laminae 157a, 158 are provided with friction linings (not specifically identified) which bear against each other in response to engagement of the clutch. 165, i.e., in response to appropriate axial displacement of the turbine 153.

The torque converter 150 further comprises an elongated tubular connector 160 which extends in at least substantial parallelism with the axis of the housing 151 and establishes a path for the flow of a suitable coolant (such as oil) between the compartment defined by the core 157 and a compartment 161 -between the shell 155 of the turbine 153 and the left-hand wall of the housing 151 (i.e., that wall which is nearer to the output element of a prime mover, see the part 7 in the torque converter 1 of FIG. 1). The coolant flows from the compartment 161 into the core 157 to withdraw heat from the friction linings of the clutch 165.

The tubular connector 160 preferably contains at least one flow restrictor (not specifically shown) which renders it possible to regulate the rate of the flow of coolant from the compartment 161 toward the clutch 165. The friction linings of the clutch 165 are preferably provided with channels, grooves, holes, recesses and/or other configurations to ensure adequate cooling of such friction linings in spite of the fact that they are parallel to each other. It is clear that the torque converter 150 can comprise two or more connectors for the admission of flowable coolant from the compartment 165 into the compartment defined by the core 157.

An axially displaceable annular sealing element 162 is adjacent the radially outermost portion of the shell 155 in the housing 151 and is displaced by the turbine 153 when the latter is caused to move axially in a direction to the left, as viewed in FIG. 9. Such axial displacement of the turbine 153 causes the element 162 to seal the compartment 161 from the core 157.

Figure 10:
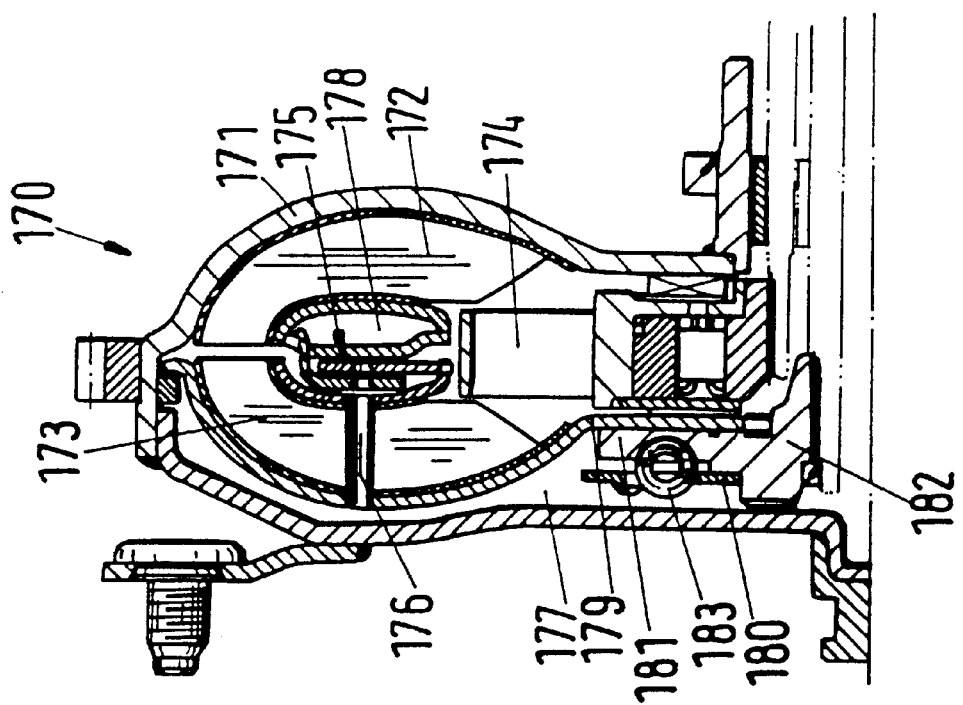
FIG. 10 is a fragmentary axial sectional view of a torque converter constituting a modification of the structure shown in FIG. 9.

FIG. 10 shows a hydrokinetic torque converter 170 which constitutes a modification of the torque converter 150 shown in FIG. 9. The housing 171 of the torque converter 170 confines a pump 172, a turbine 173 and a stator 174. The parts 172, 173, 174 define a torus having a core 178 for a lockup clutch 175. The tubular connector 176 establishes a path for the flow of a suitable coolant from the compartment 177 to the compartment defined by the core 178; such coolant removes heat from the friction linings of the clutch 175 when this clutch is engaged to transmit torque between the turbine 173 and the pump 172.

The shell 179 of the turbine 173 has a radially inner portion which is non-rotatably connected with an annular component 180 preferably having a circular outline. The hub 182 of the turbine 173 has a radially outer portion 181 which is disposed between the parts 179 and 180, as seen in the axial and radial directions of the housing 171. Energy storing elements 183 are provided to act in the circumferential direction of the housing 171 and to transmit torque between the shell 179 and the flange-like portion 181 of the hub 182. The energy storing elements 183 can constitute arcuate coil springs each having a first half received in a suitable window of the annular component 180 and a second half received in a recess, pocket, window or other suitable socket or receptacle of the flange-like portion 181. It will be seen that the torsional vibration damper of FIG. 10 is similar to the damper 65 in the torque converter 60 of FIG. 4.

Figure 11:
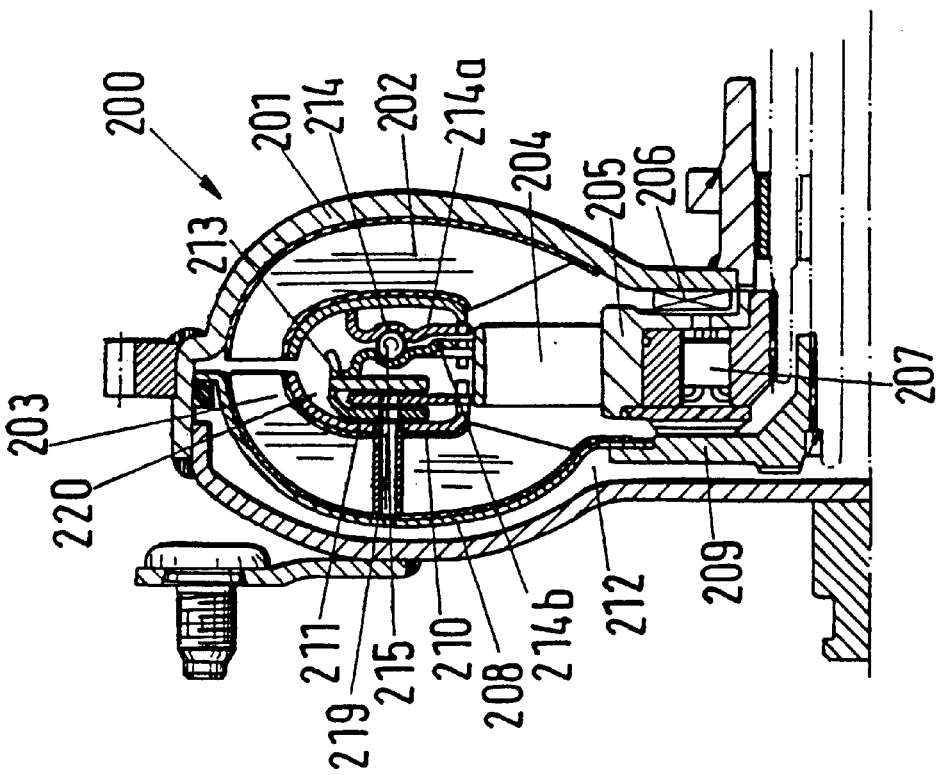
FIG. 11 is a fragmentary axial sectional view of a torque converter constituting another modification of the structure shown in FIG. 9.

The hydrokinetic torque converter 200 of FIG. 11 comprises a rotary housing 201 for a pump 202, a turbine 203 and a stator 204. The stator 204 has a hub 205 containing a freewheel 207 and abutting a thrust bearing 206 adjacent the inner side of that wall of the housing 201 which is remote from the prime mover.

The turbine 203 comprises a radially outer part or shell 208 and a radially inner part or hub 209. The vanes or blades 210 of the turbine 203 are carried by the shell 208.

The lockup clutch 211 of the torque converter 200 is installed at the core 220 of the torus which is defined by the parts 202, 203 and 204. This clutch is engaged and disengaged in response to changes of fluid pressure in the compartment 212 between the left-hand wall of the housing 201 and the shell 208. When engaged, the clutch 211 transmits torque between the turbine 203 and the pump 202.

A torsional vibration damper 214 is installed between the pump 202 and the input element or component of the lockup clutch 211. The damper 214 comprises two parts or carrier elements 214a, 214b which are respectively provided with annuli of first ramps and second ramps complementary to the first ramps. The damper further comprises rolling elements 215 (e.g., spheres) each disposed between one of the first ramps and the complementary second ramp. When the parts 214a, 214b are caused to change their angular positions relative to each other, they are caused to move axially away from one another or are permitted to move axially nearer to one another. This entails a more or less pronounced engagement of the lockup clutch 211 with attendant regulation of torsional vibrations.

The part 214a is non-rotatably affixed to the pump 202, and the part 214b is is non-rotatably affixed to the input element of the lockup clutch 211.

The torque converter 200 further comprises a tubular connector 219 which can supply a flowable coolant from the compartment 212 into the core 220, i.e., to the friction linings of the lockup clutch 211. Such friction linings are preferably provided with channels, grooves, openings, ports and/or other suitable configurations to ensure satisfactory distribution of coolant in the core 220, i.e., to ensure adequate-cooling of each portion of each friction lining forming part of the lockup clutch 211 in the core 220.

Figure 12:
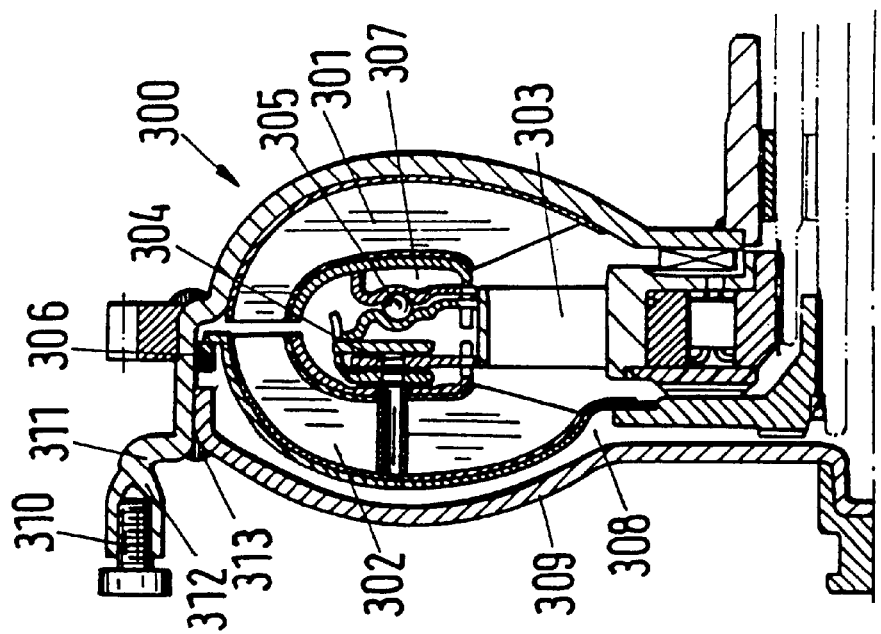
FIG. 12 is a fragmentary axial sectional view of a torque converter constituting still another modification of the structure shown in FIG. 9.

The hydrokinetic torque converter 300 of FIG. 12 comprises a rotary housing 309 for a pump 301, a turbine 302 and a stator 303, and is similar to the torque converter 200 of FIG. 11. A lockup clutch 304 is installed at the core 307 of a torus defined by the parts 301, 302 and 303, and a torsional vibration damper 305 is provided at the core 307 in a manner similar to that described in Connection with the damper 214 of FIG. 11.

The torque converter 300 further comprises an annular sealing element 306 which performs the same function as the aforedescribed sealing element 162 shown in FIG. 9, i.e., the element 306 can seal the compartment 308 when the turbine 302 is caused to move axially of the housing 309 and away from the pump 301. A similar sealing element (not referenced) is also provided in the torque converter 200 of FIG. 11. The clutch 304 is disengaged when the fluid pressure in the compartment 308 is raised so that the turbine 302 is caused to move away from the prime mover, i.e., away from the left-hand wall of the housing 309. The seal between the core 307 and the compartment 308 is interrupted when the turbine 302 is shifted in a direction to the right because the element 306 is then free to move away from sealing engagement with the radially outermost portion of the left-hand wall of the housing 309.

The means for transmitting torque from the prime mover to the housing 309 comprises an extension 311 of the radially outermost portion of the right-hand wall of the housing and fasteners 310 (e.g., bolts or screws) which can be driven into tapped bores 312 or analogous recesses in the left-hand end face of the extension 311. The fasteners 310 can secure the extension 311 (and hence the entire housing 309) to an output element of the type shown in FIG. 1 (as at 7). The recesses 312 can constitute properly dimensioned slits in the left-hand end face of the extension 311.

The character 313 denotes a welded, soldered or other suitable joint between the extension 311 of the right-hand wall and the left-hand wall of the housing 309.

The torque converters shown in FIGS. 1 to 6, 9 and 10 are constructed in such a way that, starting with the input member, the lockup clutch is first to be installed in the path of transmission of torque to the output member of the torque converter. The lockup clutch is followed by the torsional vibration damper (except in FIG. 3 because the torque converter shown in FIG. 3 does not employ a torsional vibration damper).

The sequence is different in the torque converters which are shown in FIGS. 7, 8, 11 and 12 because the torsional vibration damper is installed ahead of the lockup clutch (as seen in the direction of transmission of torque).

Each of the heretofore described torque converters can further comprise suitable parallel- or series-connected friction damping elements, such as friction discs.

Figure 13:
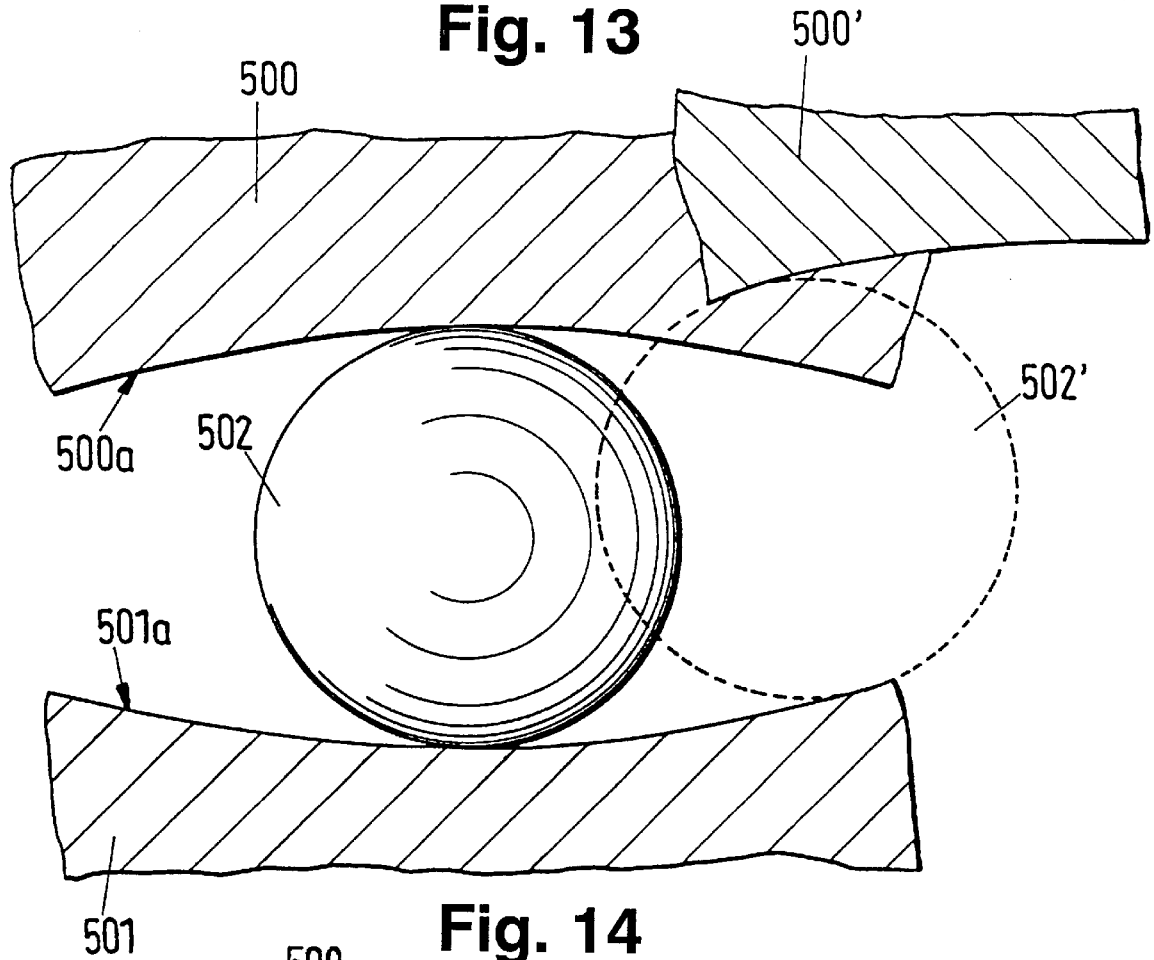
FIG. 13 is an enlarged fragmentary axial sectional view of a torsional vibration damper which is utilized, for example, in the torque converter of FIG. 1.

FIG. 13 shows schematically, drawn to a much larger scale, certain details of a torsional vibration damper such as the damper 20 in the torque converter 1 of FIG. 1. Torsional vibrations are counteracted by spherical rolling elements 502 (only one shown in FIG. 13) each of which is installed between a ramp 500a of a first carrier element 500 (corresponding to the piston 16 of the lockup clutch 15 shown in FIG. 1) and a complementary ramp 501a of a second carrier element 501 (corresponding to the hub 12b of the turbine 12 shown in FIG. 1). One or more energy storing elements not shown in FIG. 13 but corresponding to the energy storing means 21 shown in FIG. 1) are provided to bias the carrier elements 500 and 501 toward each other so that each rolling element 502 is maintained in uninterrupted contact with the respective ramps 500a and 501a.

When the carrier elements 500 and 501 are not caused to turn relative to each other, the rolling element 502 assumes the central or neutral position which is shown in FIG. 13. The energy storing means which acts upon the carrier elements 500 and 501 in a sense to urge the ramps 500a and 501a toward each other is preferably installed to automatically maintain the parts or elements or members 500, 501 and 502 in the positions shown in FIG. 13 when the carrier element 500 and/or the carrier element 501 is not subjected to the action of a force which is sufficiently pronounced to change the angular positions of the elements 500, 501 relative to each other, for example, to move the element 500 relative to the element 501 to the position 500' of FIG. 13.

The ramps 500a and 501a have substantially paraboloid shapes.

If the carrier element 500 is caused to move relative to the carrier element 501 so that it assumes the position 500' of FIG. 13, the element 502 rolls along the concave ramps 500a, 501a and assumes the position 502' when the element 500 reaches the position 500'. The element 500 is then located at a greater axial distance from the element 501. Readily detectable damping of torsional vibrations takes place as a result of frictional engagement between the ramps 500a, 501a on the one hand and the rolling element 502 on the other hand, because the elements 500, 501 are biased against the rolling element 502 by the aforementioned energy storing means (such as the energy storing means 21 in the damper 20 of the hydrokinetic torque converter 1 shown in FIG. 1). The energy storing means 21 can constitute or include a diaphragm spring.

The torsional vibration damper embodying the structure of FIG. 13 can be designed in such a way that the torque which is required to move the carrier element 500 relative to carrier element 501 and/or vice versa amounts to approximately 10 newton-meters per degree at a total angular displacement of about 6°. In such instance, the damper torque amounts to or approximates 60 newton-meters.

Figure 14:
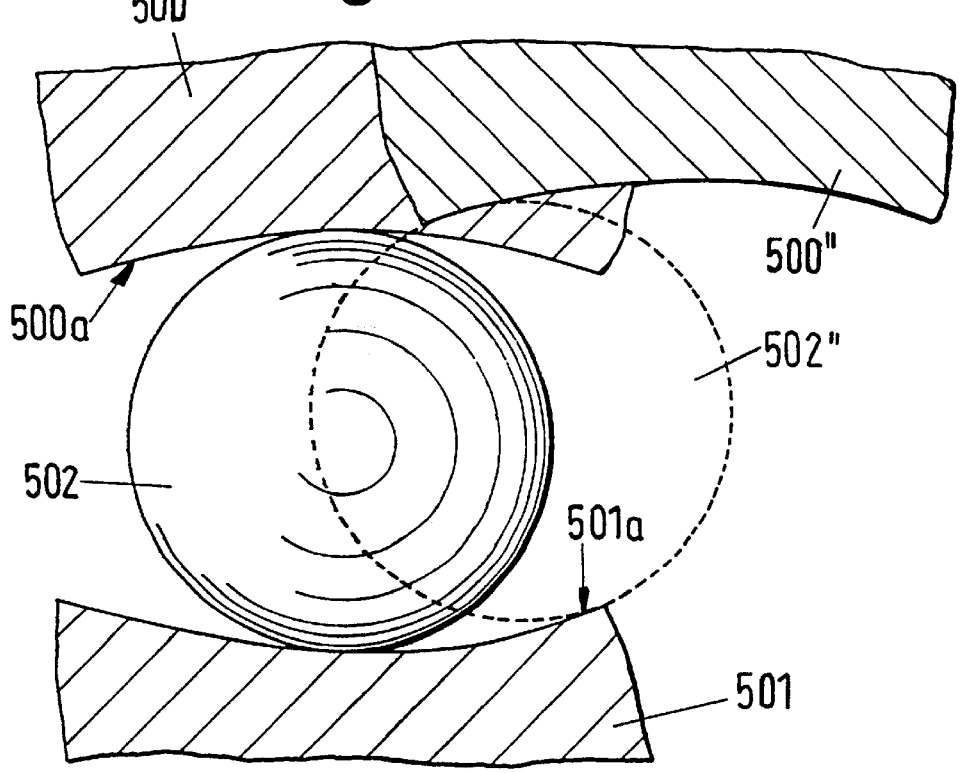
FIG. 14 is a similar enlarged fragmentary axial sectional view of a slightly modified torsional vibration damper.

FIG. 14 also shows the rolling element 502 in a neutral or median position:. when the carrier element 500 and/or 501 is not subjected to the action of a torque which is sufficient to overcome the bias of the energy storing means (such as 21 in the torsional vibration damper 20 of FIG. 1) serving to urge the elements 500, 501 axially and toward each other. When the element 500 is moved to the position 500" (while the element 501 remains in its angular position), the rolling element 502 moves to the position 502". If the configuration of the ramps cooperating with the rolling element 502 of FIG. 14 is such that a torque of 20 newton-meters per degree is required for a total angular displacement of 3° in either direction, i.e., if the maximum applied torque is 60 newton-meters, the nominal final damper torque corresponds to the nominal final damper torque in the damper including the structure of FIG. 13.

The ramps 500*a* and 501*a* exhibit a certain curvature (as mentioned above, the elements 500 and 501 can be provided with paraboloid ramps) because, if the ramps were linear, the application of a force which would be required to move the carrier element 500 (e.g., a piston) relative to the carrier element 501 would entail a movement of the rolling elements 502 to their end positions in response to the application of a constant force. In view of such circumstances, it is necessary to impart to the ramps a progressive configuration which ensures that the characteristic curve of the damper is at least substantially linear, or progresses in accordance with another functional relationship, within the useful or required range of angular movements.

FIGS. 15*a* to 15*f* illustrate certain details of additional embodiments of the improved hydrokinetic or hydrodynamic torque converter, and more specifically certain details of various lockup clutches which can be utilized in the improved torque converter.

The operation of a lockup clutch can be controlled by regulating the relationship of fluid pressures in the compartments of such clutch. This renders it possible to engage, disengage or partially engage a lockup clutch in dependency upon changes of one or more parameters of a large variety of parameters including, for example, the operating condition of a combustion engine (such as the engine RPM), the selected ratio of the transmission, the speed of the motor vehicle and/or the required output as selected by the operator of the motor vehicle. As a rule, the lockup clutch can be operated in fully engaged condition, it can be disengaged, or it can be operated with a selected degree of slip.

When the lockup clutch is disengaged, the application of forces is preferably such that the friction surfaces of the clutch do not cause the generation of any, or any appreciable, drag torque. On the other hand, when the lockup clutch is fully engaged, the RPM differential between the contacting friction linings or friction surfaces is zero or at least very close to zero. When the lockup clutch is caused to operate with a certain amount of slip, one establishes a preselected or predetermined differential between the rotational speeds of confronting sets of friction linings and/or friction surfaces in the lockup clutch. The selected RPM differential (when the lockup clutch is caused to operate with slip) depends upon one or more of a variety of factors including the permissible thermal stressing of the lockup clutch and/or of the torque converter, the desired extent of damping of torsional vibrations, and/or others.

FIG. 15*a* shows one wall of a housing 601 forming part of a torque converter. The housing 601 contains a turbine 602 having a shell 603 which confronts the left-hand wall of the housing 601, namely the wall which is adjacent the output element of the prime mover (the illustrated wall of the housing 601 corresponds to the wall 4 of the housing 2 shown in FIG. 1). The shell 603 has a radially outer portion 604 constituting the frustum of a hollow cone and carrying a friction lining 605 forming part of the lockup clutch. When the lockup clutch in the housing 601 is at least partially engaged, the friction lining 605 bears upon a friction surface 606 provided at the inner side of the radially outer portion of the illustrated wall of the housing 601. Such radially outer portion of the wall is also a hollow conical frustum having an inclination which matches or approximates that of the conical portion 604 of the shell 603.

The friction lining 605 is provided with grooves 607 which enable a suitable coolant (e.g., a hydraulic fluid) to adequately cool the entire friction lining 605 when the lockup clutch is at least partially engaged and the compartment between the illustrated wall of the housing 601 and the shell 603 of the turbine 602 contains a pressurized hydraulic fluid flowing from such compartment into the other compartment, e.g., that defined by the core of the torus formed by the turbine 602, by the pump (not shown) and the stator (not shown) in the housing 601. The number and the distribution of grooves 607 determine the quality (intensity) of the cooling action upon the friction lining 605.

The aforementioned core of the torus is bounded by the radially inner and radially outer marginal portions 608*a* and 608*b* of the turbine 602.

The pattern of grooves 607 in the friction lining 605 can be selected in such a way that such grooves establish at least one continuous channel extending in the radial direction of the housing 601 and establishing a path having no components in the circumferential direction of the friction lining 605 or having at least one component in the circumferential direction. It has been found that the cooling action of the fluid flowing in the grooves 607 can be particularly satisfactory if the body of fluid flowing along the path or paths defined by such grooves has at least one component in the radial direction and at least one component in the circumferential direction of the conical portion 604 of the shell 603. Still further, the grooves 607 can be configured and distributed in such a way that they establish at least one substantially zig-zag shaped or meandering path for the flow of fluid coolant. Furthermore, the grooves 607 can establish one or more paths including one or more portions for continuous (uninterrupted) flow of a coolant therein as well as one or more dead ends wherein the coolant can stagnate or can flow only at a relatively low speed. It will be seen that there are a practically infinite number of different patterns for the groove or grooves 607 in the friction lining 605. The conical portion 604 of the shell 603 can be obtained by resorting, for example, to a deep drawing technique. However, it is equally within the purview of the invention to replace the conical portion 604 with a portion which extends at least substantially radially of the axis of the housing 601. It is then necessary to change the configuration of the radially outer portion of the illustrated wall of the housing 601 accordingly.

FIG. 15*b* shows the housing 651 of a hydrokinetic torque converter which comprises a turbine 653 and a lockup clutch 652 having a friction lining 655 on the conical radially outer portion of a shell 654 forming part of the turbine 653. The lockup clutch 652 further comprises a conical friction surface 656 provided on a conical radially outer portion of the illustrated wall of the housing 601. The friction surface 656 has grooves 657 which enable a coolant (e.g., a hydraulic fluid) to flow between the friction lining 655 and the friction surface 656 and to thus withdraw at least some heat from the lockup clutch when the latter is at least partially engaged, i.e., when the friction lining 655 bears (with or without slip)

upon the friction surface 656. The extent to which the lockup clutch 652 is engaged depends upon the position of the turbine 653 which is movable in and in the axial direction of the housing 651. The distribution of the grooves 657 in the friction surface 656 may but need not be the same as the distribution of grooves 607 in the friction lining 605 shown in FIG. 15a. It is clear that the friction lining 655 of the lockup clutch 652 can also have one or more grooves in order to further enhance the flow of a coolant through and the cooling action upon the lockup clutch 652.

The just mentioned modification is shown in the FIG. 15c. The friction lining 670 on the conical radially outer portion of the turbine shell has a first groove or a first set of grooves 671, and the complementary friction surface at the inner side of the conical radially outer portion of the illustrated wall of the housing 672 of the torque converter has a second groove or set of grooves 673.

FIG. 15d shows a portion of a further torque converter wherein the lockup clutch comprises a friction lining 700 having an array of grooves 705 and being bonded or otherwise secured to the inner side of the conical radially outer portion of the illustrated wall of the housing 701. The friction lining 700 is contacted by the friction surface on the adjacent conical portion of a piston 702 which forms part of or is affixed to the shell of the turbine 703 in the housing 701. The friction surface of the piston 702 can also comprise grooves to further enhance the cooling action upon the lockup clutch.

Referring to FIG. 15e, there is shown a portion of a torque converter having a rotary housing 711 with a wall which is adjacent the output element (not shown) of the prime mover and includes a conical radially outer portion supporting a conical friction lining 710. This lining forms part of a lockup clutch which further includes a piston 712a having a conical radially outer portion provided with a friction surface which confronts and is engageable with the friction lining 710 when the lockup clutch is to transmit torque between the housing 710 and a turbine 712. The latter includes a shell 715 which carries the vanes or blades of the turbine and which also supports or is of one piece with the piston 712a.

The piston 712a is provided with circular ports 713, 714 and/or other suitable openings for the flow of a coolant behind the conical friction surface of the piston, and such flow of coolant is or can be in addition to the flow of the same coolant or a different coolant along and/or around the friction lining 710 on the illustrated wall of the housing 711. Furthermore, the flow of a fluid coolant through the ports 713, 714 can be in addition to and/or independent of a fluid flow at or through the shell 715 of the turbine 712, i.e., at or through that part of the turbine which supports the turbine vanes or blades.

The shell 715 is assembled of several portions or sections which are secured to each other and each of which can carry one or more turbine blades or vanes. The discrete portions or sections of the shell 715 can be riveted, welded and/or otherwise reliably secured to each other.

The piston 712a can carry a friction lining, e.g., a grooved friction lining corresponding to the friction lining 670 shown in FIG. 15c. Furthermore, the friction lining 710 can be replaced with a friction surface on the housing 711 or with a grooved or channeled friction lining such as the friction lining 700 of the lockup clutch shown in FIG. 15d.

FIG. 15f shows a further modification of the torque converter which is illustrated in FIG. 15e. Thus, a friction lining 720 (with or without a pattern of grooves) is provided at the inner side of the conical radially outer portion of the housing 721, and the complementary friction surface of the lockup clutch is provided at the left-hand side of the conical radially outer portion of a piston 722 which shares the axial movements of a turbine 723 relative to the housing 721 to thus engage or disengage the lockup clutch or to engage the lockup clutch to a desired extent. The turbine 723 and the piston 722 define a chamber or compartment 724 which is located behind the friction surface of the piston and through which a stream of suitable coolant can flow due to the provision of ports 725, 726 and/or analogous openings or passages in the shell of the turbine 723. Of course, additional coolant can be caused to flow around and/or in the grooves (if any) of the friction lining 720 to even further enhance the cooling action upon the lockup clutch including the friction lining 720 and the axially movable piston 722 of FIG. 15f.

FIGS. 15a to 15f merely show certain presently preferred modes of cooling the lockup clutch in the housing of a hydrokinetic torque converter. Analogous cooling techniques can be resorted to if the illustrated conical friction linings and friction surfaces are replaced with plane or flat friction linings and friction surfaces extending at least substantially radially of the axis of the housing of the torque converter. Furthermore, the piston of the lockup clutch can share the axial movements of the turbine (this is actually shown in FIGS. 15a to 15f), or the piston of the lockup clutch can be mounted for movement relative to the turbine. Still further, the piston of the lockup clutch can be installed to share the axial movements of the shell but not of the hub of a turbine in the housing of a torque converter. In other words, the above outlined and/or analogous cooling techniques for the lockup clutch can be resorted to irrespective of whether the entire turbine is movable axially of the housing of the torque converter, whether the entire turbine is held against any axial movement relative to the housing, or whether a first part of the turbine is movable and a second part of the turbine cannot move axially relative to the housing.

Adequate cooling of the lockup clutch is desirable and advantageous when the torque converter is set up for operation in such a way that the confronting flat or conical friction linings and/or friction surfaces of the lockup clutch operate or can operate with accurately controlled slip, i.e., when the torque converter is to operate with the lockup clutch fully disengaged, fully engaged or partially engaged (so that the input and output components of the lockup clutch can slide relative to each other to a predetermined extent in order to transmit torque of a desired magnitude).

It has been found that the cooling systems which are shown in and/or which were described with reference to FIGS. 15a to 15f are particularly satisfactory to ensure adequate cooling of the lockup clutch irrespective of whether the cooling involves the flow of a coolant through the grooves of and/or around a fixed or axially movable friction surface and/or friction lining, and/or whether the cooling involves the flow of a coolant behind a friction lining and/or a friction surface (as shown in FIGS. 15e and 15f). The coolant can be oil or any other suitable flowable medium.

Figure 16A:
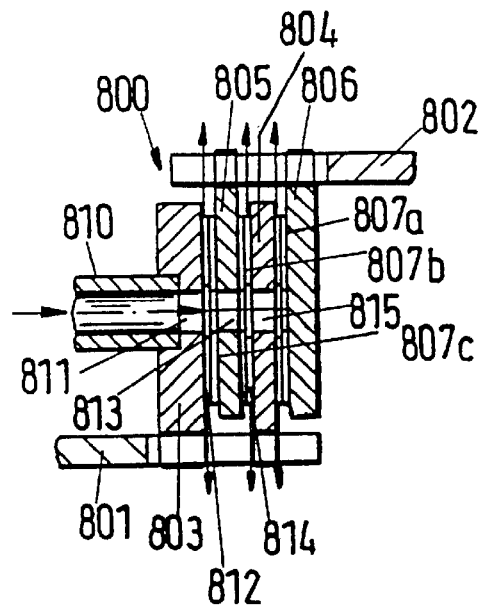
FIG. 16a is a sectional view of a lockup clutch which can be used in the improved torque converter, for example, in the torque converter of FIGS. 9, 10, 11 or 12.

FIG. 16a shows a lockup clutch 800 which is a disc clutch and can be identical with or similar to the lockup clutch 165 at the core 157 of the torus defined by the pump 152, turbine 153 and stator 154 in the housing 151 of the torque converter 150 shown in FIG. 9. The clutch 800 comprises at least one component or element 801 preferably having a circular or substantially circular outline, and at least one element or component 802 which is movable with and relative to the component 801. The component 801 is assumed to be fixedly secured to the turbine (such as 153), and the component 802 is assumed to be non-rotatably secured to the pump (such as 152) of the torque converter embodying the lockup clutch 800. It is also within the purview of the invention to install at least one torsional vibration damper between the component 801 and the turbine and/or to install at least one torsional vibration damper between the component 802 and the pump.

Each of the preferably circular components 801, 802 carries a set of friction linings and/or friction surfaces. In the clutch. 800 of FIG. 16*a*, the component 801 carries two spaced-apart parallel laminae or discs 803, 804 which alternate with the parallel laminae or discs 805, 806 of the component 802. The discs 803, 804 and 805, 806 are non-rotatably carried by the respective components 801 and 802. The discs 805 and 806 carry three friction linings 807*a*, 807*b* and 807*c*. The arrangement is such that the friction linings 807*b*, 807*c* are applied to opposite sides of the disc 805, and that the friction lining 807*a* is applied to that side of the disc 806 which confronts the disc 804. It is equally possible to apply friction linings to the discs 803, 804 in addition to or in lieu of the friction linings 807*a* to 807*c*.

The discs 803, 804 are movable axially relative to the component 801, and the discs 805, 806 are movable axially relative to the component 802. When the lockup clutch 800 is disengaged (because the components 801, 802 are maintained in predetermined positions relative to each other as seen in the axial direction of the housing forming part of the torque converter and confining the lockup clutch 800), the friction linings 807*a* to 807*c* of the discs 805, 806 are not in frictional engagement with the discs 803, 804 (or are not in sufficient frictional engagement with the discs 803, 804) so that the clutch 800 cannot transmit any torque. However, if the component 801 is moved in the axal direction of the housing, the friction lining 807*a*, 807*b* respectively engage the discs 803, 804 and the friction lining 807*c* engages the disc 804 so that the clutch 800 begins to transmit torque with or without slip. The magnitude of transmitted torque can vary between zero and the nominal torque of the combustion engine, i.e., the torque being transmitted to the component 802 which is non-rotatably affixed to the housing of the torque converter. The lockup clutch 800 can operate with or without slip between the discs 804, 804 and 805, 806, depending on the selected axial position of the component 801 relative to the component 802.

FIG. 16*a* further shows a connector 810 (e.g., an elongated pipe or tube) which is parallel to the axis of rotation of the housing for the lockup clutch 800 and serves to supply a coolant to the discs 803–806 and friction linings 807*a*–807*c*. The connector 810 is secured to the disc 803 which is provided with a port 811 or another suitable opening or passage for the flow of coolant from the discharge end of the connector 810 into the space for the discs 804–806 and friction linings 807*a*–807*c*. The discs 804, 805 and friction linings 807*a*–807*c* are also provided with openings for the flow of coolant therein or therethrough. No opening need be provided in the disc 806 at the outer end of the cascade of discs forming part of the lockup clutch 800.

The friction lining 807*c* is provided with one or more grooves 812 which receive coolant from the opening 811 in the disc 803 to thus provide an even more satisfactory cooling action. The coolant which flows through the opening 813 of the disc 805 can flow radially outwardly in the groove or grooves 814 in the friction lining 807*b* and/or in the left-hand side of the disc 804. At least some of the spent or partially spent coolant can escape radially inwardly and/or radially outwardly of the disc 804 and/or 805. Furthermore, at least some of the coolant can flow through the opening 815 of the disc 804 and into the groove or grooves (if any) in the friction lining 807*a* and/or in the friction surface at the right-hand side of the disc 804. Spent fluid which is to leave the space between the discs 804 and 806 can escape radially inwardly and/or radially outwardly.

Figure 16B:
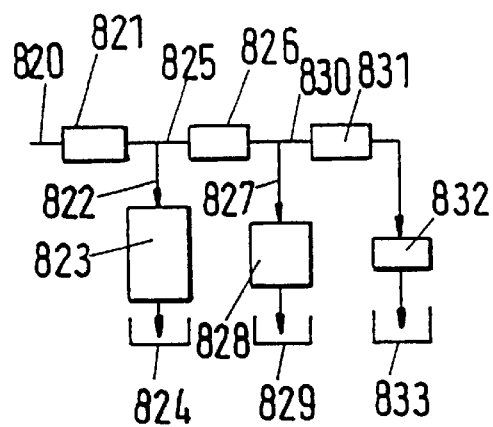

The diagram of FIG. 16*b* illustrates various resistances which are encountered by the stream or flow of coolant admitted into the connector 810 of FIG. 16*a*. The stream or flow of inflowing coolant is shown at 820, and the box 821 denotes the combined flow resistance offered by the connector 810 and the surface bounding the opening 811 in the disc 803. The stream 820 issuing from the opening 811 is divided into a first branch 822 flowing through the groove or grooves 812 (which offer a resistance 823) and into a sump 824, and a second branch 825 flowing through the opening 813 which offers a resistance 826. The initial pressure of coolant forming the stream 820 can be selected with a desired degree of accuracy, and the same applies for the resistance offered by the connector 810 and opening 811 (shown at 821), by the groove or grooves 812 (shown at 823) and by the opening 813 (shown at 826). The branch stream 825 leaving the opening 813 is divided into two branches 827 and 830; the branch 827 flows in the groove or grooves 814 (offering a resistance 828) and into a sump 829, and the branch 830 flows through the opening 815 offering a resistance 831, and into the space for the friction lining 807*c* (offering a resistance 832) prior to entering a sump 833.

The various resistances to the flow of fluid forming the stream 820 can be selected in such a way that the quantities of spent fluid flowing into the sumps 824, 829 and 833 are the same or nearly the same. This ensures the establishment of a uniform or nearly uniform cooling action at each of the friction linings 807*a*, 807*b* and 807*c*.

The friction linings 807*a*, 807*b*, 807*c* of the lockup clutch 800 shown in FIG. 16*a* are or can constitute flat or plane washer-like bodies which are normal to the axis of the housing of the torque converter and are disposed at the core of the torus defined by the pump, turbine and stator of the torque converter. Furthermore, the discs or laminae 803 to 806 are also flat washer-like bodies extending at right angles to the axis of the housing of the torque converter (such as the torque converter 150 of FIG. 9). Furthermore, the connector or conduit 810 is positioned to supply a suitable coolant to the central portion of the annular space between the first two discs 803, 805 of the cascade of such discs forming part of the lockup clutch 800. In other words, the connector 810 supplies or can supply a suitable coolant into a region at least substantially midway between the radially innermost and radially outermost portions of the discs 803 and 805. Thus, the coolant entering the clutch 800 at 811 can flow radially inwardly toward the component 801 or 802, and/or radially outwardly toward the component 802 or 801.

Figure 16C:
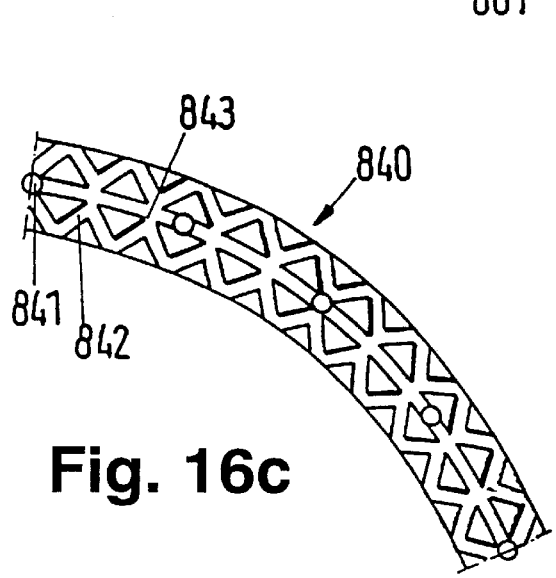

FIG. 16*c* shows the distribution of openings and grooves and/or other forms of recesses in a friction lining 840, e.g., a friction lining which can be utilized as one of the friction linings 807*a*, 807*b*, 807*c* shown in FIG. 16*a*. The friction lining 840 comprises an annulus of circumferentially spaced apart circular openings 841 for the passage of fluid coolant through such friction lining and into the opening of a disc and/or into the grooves 842, 843 machined or impressed into or otherwise formed in at least one side of the friction lining 840. For example, the grooves 842 and/or 843 can be merely impressed into the respective side or surface of the friction lining 840, or they can be obtained as a result of removal of some material at the respective side or surface of such disc. The configuration and distribution of the grooves or channels 842, 843 is such that they establish for the coolant paths for a flow substantially radially inwardly, for a flow substantially radially outwardly, and for a flow in the circumferential direction of the friction lining 840. This ensures that the coolant (such as oil) can flow practically along each and every portion of the grooved side of the friction lining 840 and hence along the entire complementary friction lining or friction surface. For example, and assuming that the friction lining 840 of FIG. 16c is to be used as the friction lining 807c of FIG. 16a, at least one of the openings 841 admits coolant from the opening or openings 811 into the opening or openings 813, and the grooves 842, 843 (corresponding to the grooves 812 in the friction lining 807c) enable the coolant to flow along the entire left-hand side of the friction lining 840 (replacing the friction lining 807c) as well as along the entire right-hand side or surface of the disc 803. This evidently ensures a highly satisfactory at least substantially uniform cooling of the friction lining 840 as well as of the disc 803; at the same time, the friction lining, 840 permits requisite quantities of coolant to flow axially toward and through the opening or openings 813 in the disc 805.

Figure 16E:
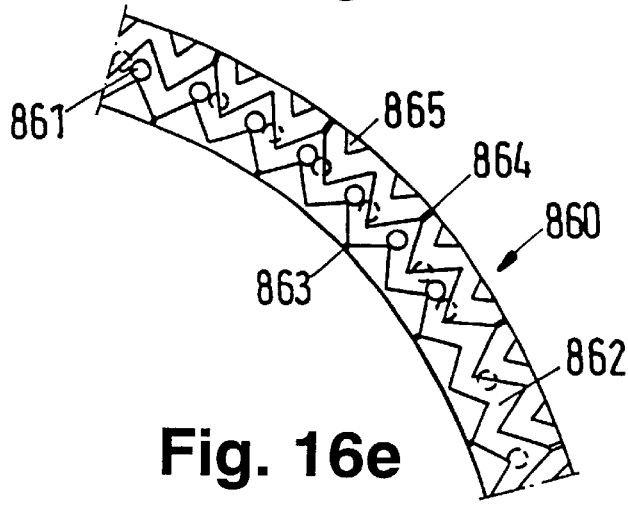
FIG. 16e is a fragmentary plan view of a third friction lining.
Figure 16D:
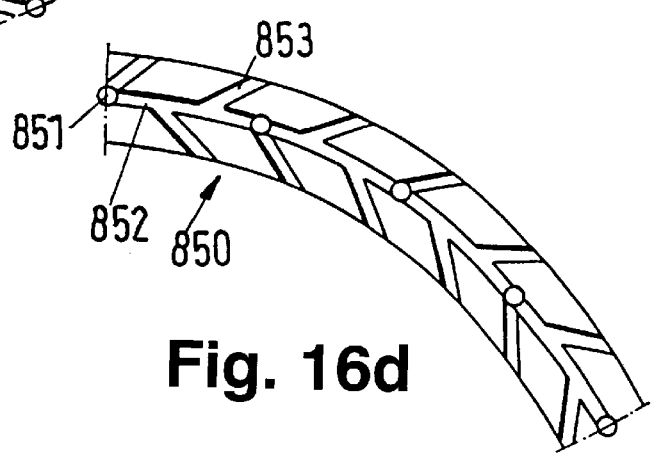
FIG. 16d is a fragmentary plan view of a modified friction lining.

FIG. 16d shows a portion of a modified friction lining 850 having an annulus of circumferentially distributed preferably uniformly spaced-apart openings 851 and grooves or recesses 852, 853. The single groove 852 extends in the circumferential direction of the friction lining 850 and communicates with the openings 851 (or with at least some of these openings), and the grooves 853 communicate with the groove 852 and extend therefrom radially inwardly and radially outwardly. The streamlets of coolant leaving the groove 852 via grooves 853 have components of flow in the circumferential direction of the friction lining 850. The grooves 852 and/or 853 can be formed by impressing them into the respective side of a blank for the making of the friction lining 850, or they can be obtained as a result of removal of some material from the respective side or sides of the blank.

Referring to FIG. 16e, there is shown a portion of a circular washer-like friction lining 860 having an annulus of openings 861, a zig-zag shaped or meandering groove 862 extending in the circumferential direction of the friction lining, and an annulus of pockets or notches or cutouts 865 provided at the radially outer portion 864 of the friction lining. The radially inner portions of the groove 862 can extend all the way to the radially inner portion 863 of the friction lining 860, and the radially outer portions of such groove can extend all the way to the radially outer portion 864. It is normally desirable to ensure that some of the coolant flowing in the groove 862 can escape from such groove at 863 and/or that some of such fluid can escape from the groove 862 at 864. For example, the pockets 865 can receive coolant which leaves the groove 862 at 864. Such pockets contribute significantly to the efficiency of the cooling action upon the friction lining 860.

Figure 17A:
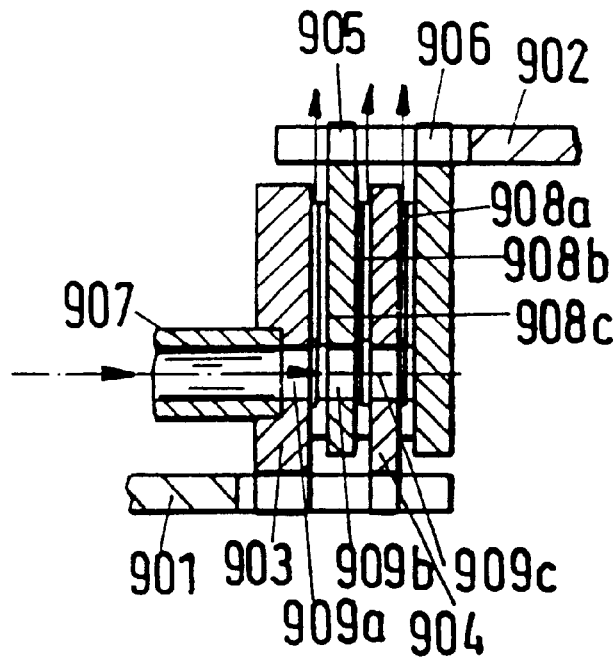

FIG. 17a shows a portion of a lockup clutch constituting a modification of the lockup clutch 800 of FIG. 16a. This lockup clutch is also assumed to be located at the core of a torus defined by the pump, the turbine and the stator in the housing of a torque converter. The component or element 901 is assumed to be secured to the turbine, and the component or element 902 is assumed to be affixed to the pump. The component 901 carries two discs or laminations 903, 904, and the component 902 carries two discs or laminations 905, 906 which alternate with the discs 903, 904 (as seen in the axial direction-of the turbine and pump). The component 901 can be directly or indirectly affixed to the turbine, and the component 902 can be directly or indirectly affixed to the pump of the torque converter including or containing the lockup clutch of FIG. 17a. If the component 901 is indirectly connected to the turbine, the indirect connection can contain at least one torsional vibration damper, and the same applies for an indirect connection between the component 902 and the pump.

The discs 903, 904 are non-rotatably carried by the component 901, and the discs 905, 906 are non-rotatably connected with the component 902. However, the discs 903, 904 and 905, 906 have freedom of requisite axial movement relative to the respective components 901 and 902. The reference character 907 denotes an elongated tubular connector or conduit or tube which serves to supply a suitable coolant (such as oil) into the range of the discs 903 to 906 and of the friction linings 908a (carried by the disc 906) and 908b, 908c (carried by the disc 905). The discharge end of the connector 907 is affixed to the disc 903. The discs 903, 905, 904 are respectively provided with openings or sets of openings 909a, 909b and 909c which enable the coolant to respectively reach the friction linings 908c, 908b and 908a. The connector 907 and the openings 909a, 909b, 909c are adjacent the radially inner portions of the discs 903 to 906, and spent coolant is assumed to leave the lockup clutch of FIG. 17a by flowing radially outwardly toward the component 902.

Figure 17B:
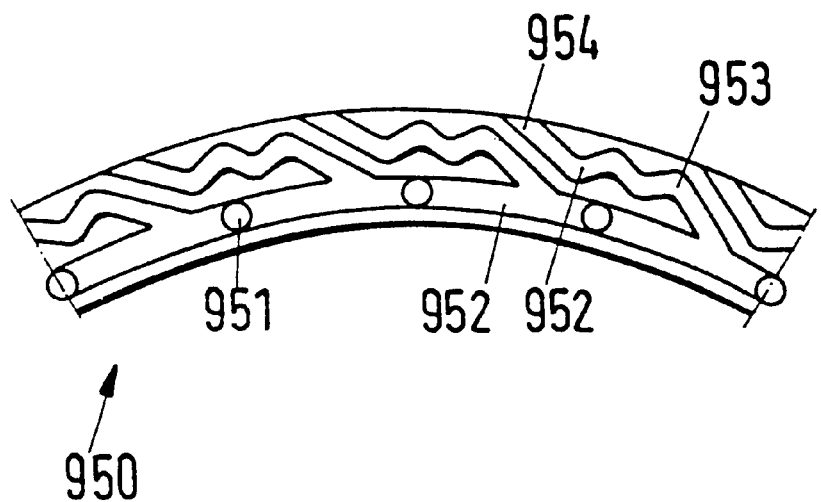

FIG. 17b shows a portion of a friction lining 950 which can be utilized, for example, in the lockup clutch of FIG. 17a to constitute or to replace the friction lining 908a or 908b or 908c. The friction lining 950 has an annulus of preferably equidistant openings 951 which permit a coolant to flow through the friction lining, and grooves 952 which permit the coolant to flow circumferentially as well as radially outwardly of the friction lining so that some coolant can be discharged at the radially outermost portion 954. In the embodiment of FIG. 17b, the grooves 952 include at least one circumferentially extending circular groove as well as a plurality of meandering or zig-zag shaped grooves branching off the circular groove and each having a plurality of elbows 953 or analogous portions which alter the direction of fluid flow from the circular groove toward the portion 954 of the friction lining 950.

The friction lining 950 can be modified in a number of ways without departing from the spirit of the invention. For example, the circular groove can be provided next to the radially outer portion 954 and the zig-zag shaped grooves (having elbows 953) can extend radially or substantially radially inwardly to discharge spent coolant adjacent the radially innermost portion of the thus modified friction lining. Furthermore, the circular groove can be disposed substantially midway between the radially outer portion 954 and the radially inner portion, and the thus modified friction lining can have a first set of substantially zig-zag shaped grooves extending radially outwardly to the portion 954 as well as a second set of substantially zig-zag shaped (and/or otherwise configurated) grooves for delivery of some coolant from the centrally located circular groove to the radially inner portion of such friction lining.

Figure 18A:
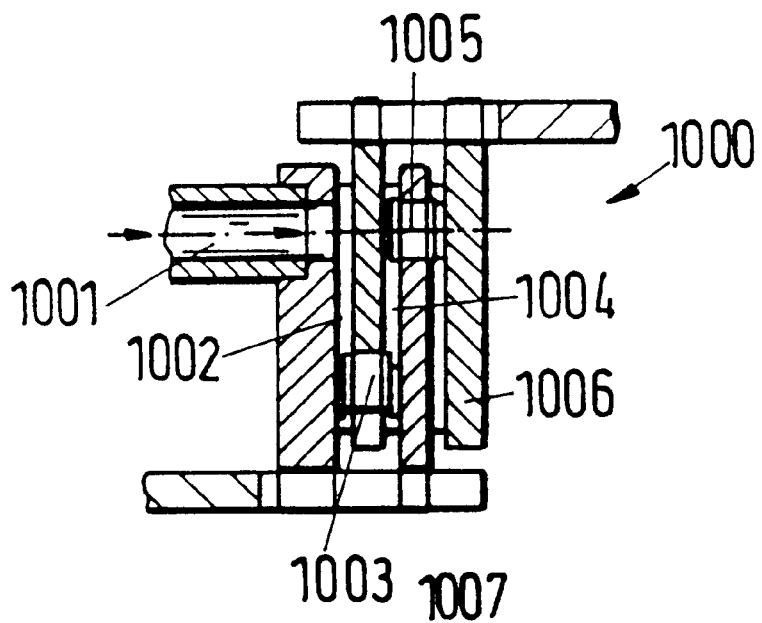

FIG. 18a illustrates a portion of a torque converter 1000 with a lockup clutch which constitutes a further modification of the clutch 800 shown in FIG. 16a. The lockup clutch of FIG. 18a is installed at the core of a torus which is defined by the pump, turbine and stator in the housing of the torque converter 1000. In contrast to the lockup clutches of FIGS. 16a and 17a (wherein the friction linings are installed to be cooled in parallel), the discs or laminae which are shown in FIG. 18a are connected to operate in series. This means that the coolant which is supplied by the connector 1001 flows along the grooved surface of the friction lining 1002 and thereupon passes through one or more openings of the disc 1003 to flow along the grooved side or surface of the next friction lining 1004. The coolant issuing from the connector 1001 flows radially inwardly, and the coolant issuing from the opening or openings of the disc 1003 flows radially outwardly. In the next step, the coolant flows through one or more openings in the disc 1005 to flow radially inwardly along the friction lining 1006 and to be evacuated at the lower component of FIG. 18a, namely the component corresponding to the member 801 in the lockup clutch 800 of FIG. 16a.

Thermal stressing of the coolant which is caused to flow in a manner as described with reference to FIG. 18a is more pronounced because the coolant is heated stepwise from friction lining to friction lining, i.e., the temperature of the stream of coolant increases from the friction lining 1002 to the friction lining 1004 and thereupon again while flowing from the friction lining 1004 to the friction lining 1006. Therefore, it is often preferred to resort to the cooling in parallel as described with reference to the lockup clutches of FIGS. 16a and 17a.

FIG. 18a further shows that the illustrated lockup clutch can comprise a number of friction linings which exceeds the number of discs. Thus, a first friction lining is provided at the right-hand side of the disc which is connected to the discharge end of the conduit or connector 1001, a friction lining 1002 is provided at each side of the disc 1003, friction linings 1004, 1007 are provided at the two sides of the disc 1005, and a friction lining 1006 is provided at the left-hand side of the rightmost disc.

Figure 18B:
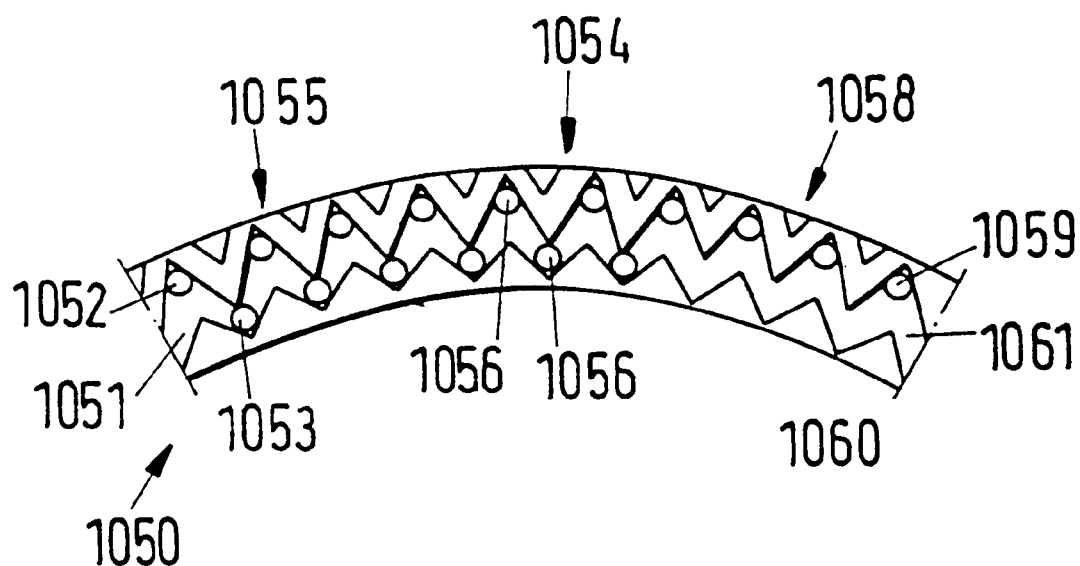

FIG. 18b shows a portion of a composite friction lining 1050 including a left-hand portion 1055 which can form part of the friction lining 1002 in the lockup clutch shown in FIG. 18a, a median portion 1054 which can form part of the friction lining 1004 of FIG. 18a, and a third portion 1058 which can form part of the right-hand friction lining 1006 of FIG. 18a.

Each of the portions 1055, 1054, 1058 is provided with a zig-zag shaped or meandering groove 1051 which establishes for the coolant a path wherein the coolant repeatedly reverses the direction of advancement by first flowing substantially radially inwardly, thereupon substantially radially outwardly, again inwardly, again outwardly, and so forth.

The radially outer part of the portion 1055 has openings 1052 which permit the coolant to enter the groove 1051 of such portion. The radially inner part of the portion 1055 is provided with additional openings 1053 which permit the coolant to flow from the friction lining 1002 into the opening or openings in the radially inner portion of the disc 1003 in the lockup clutch of FIG. 18a.

The portion 1054 is provided with an annulus of radially inner and with an annulus of radially outer openings 1056. The radially inner openings 1056 receive coolant from the opening or openings in the disc 1003, and the radially outer openings 1056 admit coolant into the opening or openings of the disc 1005. It will be noted that the distribution of the openings 1056 in the portion 1054 s similar to or identical with the distribution of openings 1052, 1053 in the portion 1055.

The radially outer part of the portion 1058 (friction lining 1006) has an annulus of openings 1059 which enable the coolant to enter the groove or grooves 1061 (after having passed through the opening or openings in the radially outer portion of the disc 1005). The configuration of the groove 1061 is or can be the same as that of the groove 1051 in the portion 1055 or 1054. The radially innermost portions of the groove 1061 can discharge spent coolant at the radially inner part 1060 of the portion 1058, and such coolant flows substantially radially inwardly, as seen in FIG. 18a.

Figure 19:
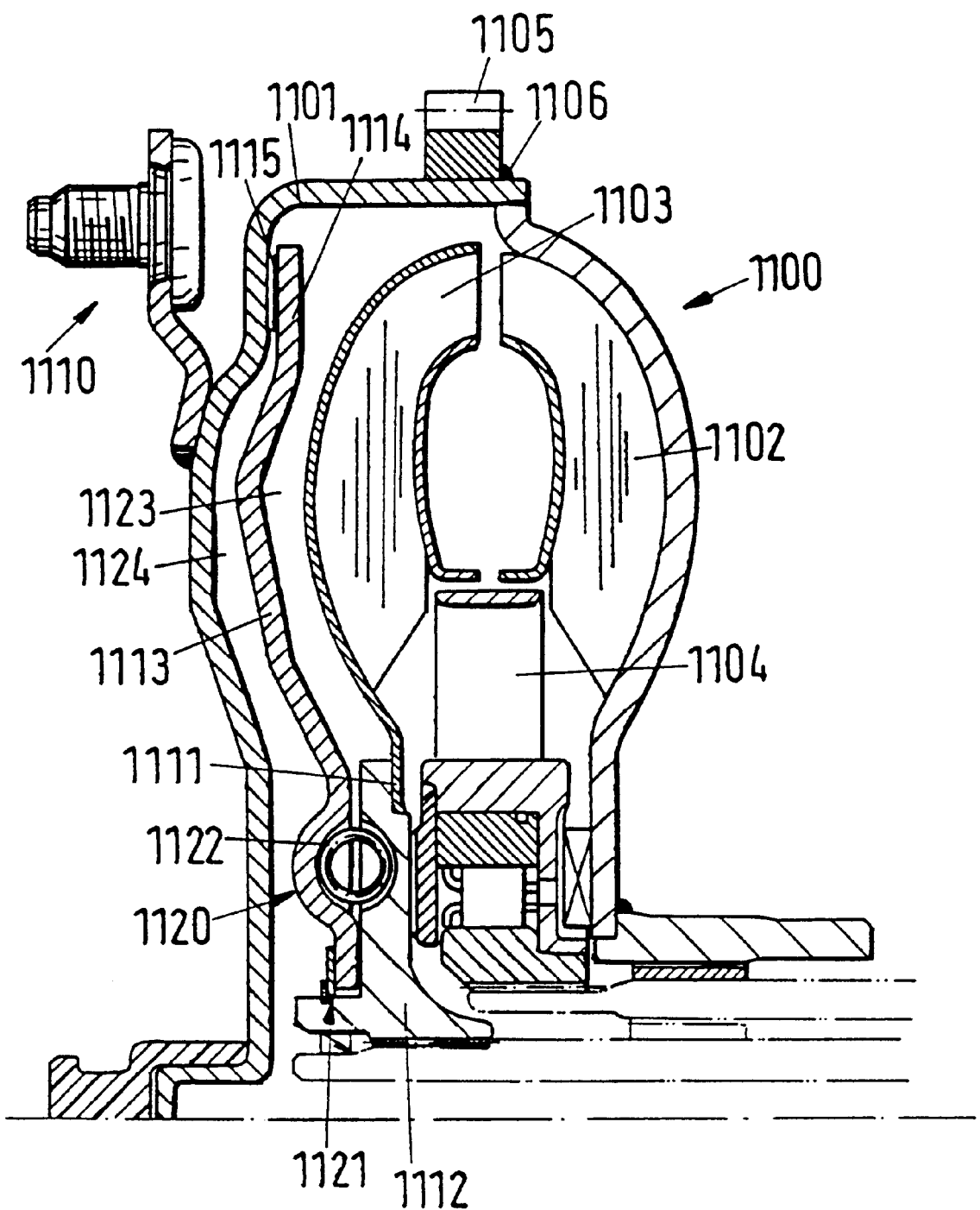
FIG. 19 is a fragmentary axial sectional view of a hydrokinetic torque converter embodying another form of the present invention.

Referring to FIG. 19, there is shown a further hydrokinetic torque converter 1100 which, in many respects, is similar to the torque converter of FIG. 2. An important difference is that the piston 1113 of the lockup clutch in the torque converter 1100 has a flat or plane radially outer portion 1114 which carries a composite or one-piece friction lining 1115 bearing against the adjacent radially extending friction surface at the inner side of the left-hand wall of a rotary housing 1101 forming part of the torque converter 1100.

The housing 1101 is or can be of one piece with a pump 1102, and this housing confines a rotary turbine 1103 and a stator 1104 (which latter is optional). The radially outermost portion of the housing 1101 carries a ring gear 1105 which can perform the function of a starter gear and is secured to the housing by a welded joint 1106 and/or in any other suitable way.

The means for rotating the housing 1101 about the common axis of the pump 1102 and turbine 1103 comprises fasteners 1110 (only one shown in FIG. 19) which can affix a coupling device of the left-hand wall of the housing with a preferably axially flexible disc-shaped output element on the crankshaft or camshaft of a combustion engine (reference may be had to the output element 7 shown in FIG. 1).

The turbine 1103 includes a shell which carries the customary vanes or blades, and a hub 1112 which is coupled to the radially innermost portion of the shell, as at 1111, in such a way that the shell shares all angular movements of the hub 1112. For example, the coupling 1111 can include a welded, a bonded, a soldered or a form-locking connection between the shell and the hub 1112 of the turbine 1103.

The radially inner portion of the piston 1113 of the lockup clutch in the housing 1101 is connected to the hub 1112 of the turbine 1103 by a torsional vibration damper 1120. A split ring 1121 or an analogous clamping or retaining element is provided to hold the radially inner portion of the piston 1113 against any, or at least against appreciable, axial movement away from the hub 1112 of the turbine 1103. Once the resistance of the energy storing elements 1122 (e.g., elongated arcuate coil springs) of the damper 1120 is overcome, the piston 1113 is free to turn relative to the hub 1112.

The piston 1113 is flanked by a first annular compartment 1123 (which is adjacent the shell of the turbine 1103), and a second annular compartment 1124 (which is adjacent the left-hand wall of the housing 1101). The lockup clutch can be engaged or disengaged (either entirely or in part) by changing the fluid pressure in the compartment 1123 and/or 1124. For example, the lockup clutch will be engaged, at least in part, if the fluid pressure in the compartment 1123 is raised above that in the compartment 1124 to an extent which is necessary to move the radially outermost portion 1114 of the piston (and hence the friction lining or friction linings 1115) into requisite frictional engagement with the inner side of the radially outer portion of the left-hand wall of the housing 1101. If the piston 1113 is sufficiently rigid so that it is not flexed in response to a rise of fluid pressure in the compartment 1123 above that in the compartment 1124, the ring 1121 compels the hub 1112 to share the axial movement of the piston, i.e., the entire turbine 1103 moves with the piston 1113 toward or away from the pump 1102. However, it is equally possible to use a flexible piston which replaces the illustrated piston 1113 and is deformable to an extent necessary to move the friction lining or linings 1115 into and from engagement with the housing 1101 while the axial position of the radially inner portion of the modified piston remains unchanged.

Figure 20:
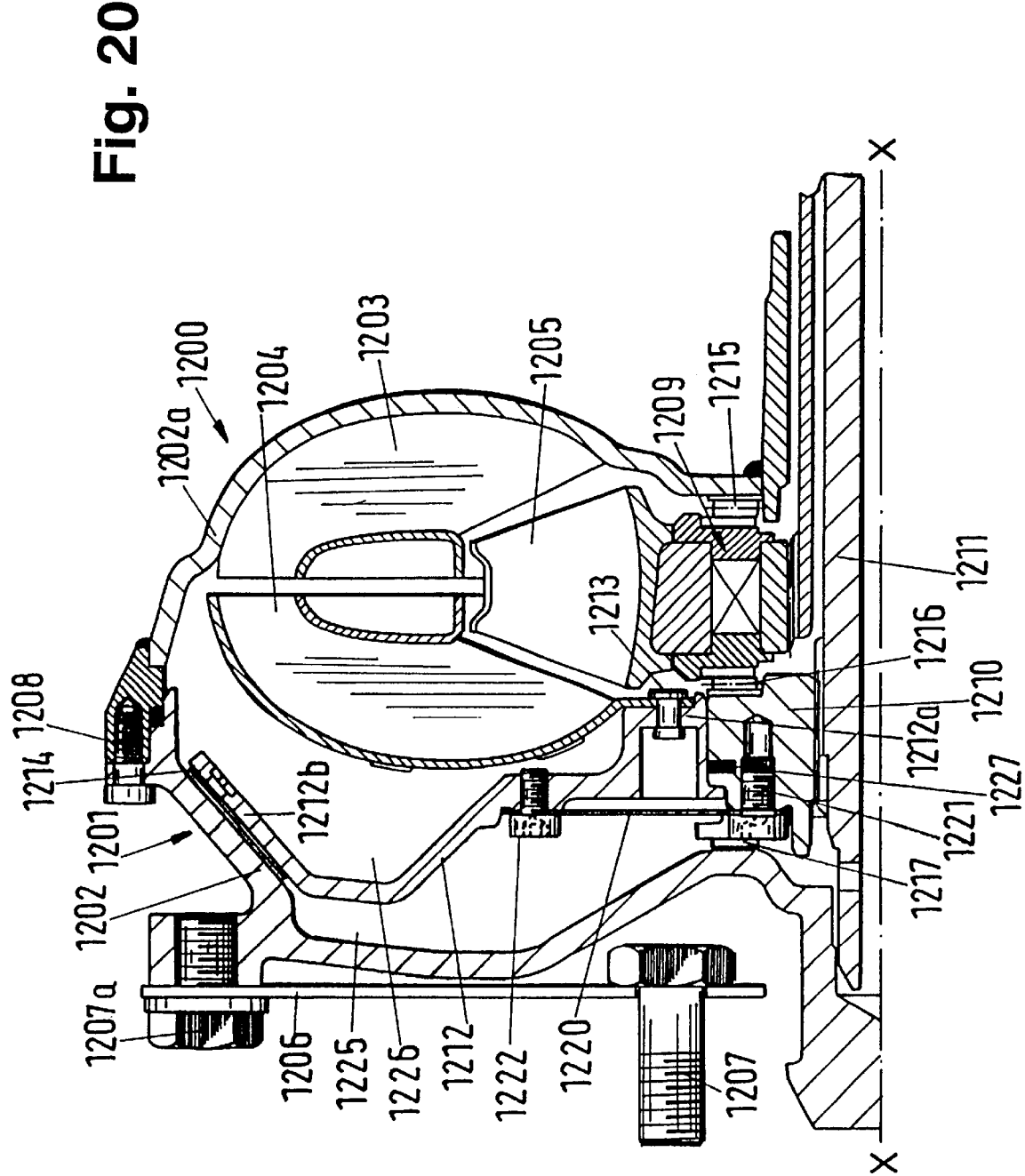
FIG. 20 is a fragmentary axial sectional view of a further torque converter.

FIG. 20 shows a portion of a further hydrokinetic torque converter 1200 having a housing 1202 containing a lockup clutch 1201, a pump 1203 (of one piece with the right-hand wall 1202a of the housing), a turbine 1204, and a stator 1205. The left-hand wall of the housing 1202 is detachably affixed to an axially deformable elastic output element 1206. The radially outer portion of the output element 1206 is secured to the housing 1202 by a set of fasteners 1207a, and the radially inner portion of the element 1206 is secured to the crankshaft or camshaft of a combustion engine (not shown in FIG. 20) by a set of fasteners 1207. Only one fastener 1207 and only one fastener 1207a is actually shown in FIG. 20.

The radially outer portions of the wall 1202a and the left-hand wall of the housing 1202 are sealingly but separably secured to each other, e.g., by threaded fasteners 1208, by one or more sealing elements and by a welded seam (or in any other suitable way).

The stator 1205 has a hub 1209 which is centered on an input shaft 1211 of a unit receiving torque from the hub 1210 of the turbine 1204. For example, the part 1211 can constitute the input shaft of a change-speed transmission in the power train between the engine and the wheels of a motor vehicle. The hub 1210 can be provided with axially parallel internal teeth received in axially parallel splines or tooth spaces in the peripheral surface of the shaft 1211 so that the latter is compelled to share all angular movements of the turbine 1204.

The lockup clutch 1201 comprises a piston 1212 having a radially inner portion 1212a which is non-rotatably secured to the shell of the turbine 1204 by one or more rivets 1213 and/or other suitable fasteners. The radially outer portion 1212b of the piston 1212 has a conical shape and is provided with a conical friction lining or friction surface 1214 (hereinafter referred to as friction lining). The piston 1212 is movable axially of the housing 1202 to move the friction lining 1214 into or from engagement with a friction lining or friction surface on the adjacent conical radially outer portion of the left-hand wall of the housing.

The radially inner portion 1212a of the piston 1212 is movable in the axial direction of the input shaft 1211 of the transmission, and more specifically in the axial direction of and relative to the hub 1210 of the turbine 1204. At the same time, the radially inner portion 1212a of the piston 1212 is non-rotatably (e.g., form-lockingly) secured to the hub 1210. The latter is held in a selected axial position by a set of thrust bearings 1215, 1216 and 1217. The means for non-rotatably but axially movably securing the radially inner portion 1212a of the piston 1212 to the hub 1210 comprises an annular coupling element 1220 (e.g., a membrane) having a radially outer portion affixed to the piston 1212 by fasteners 1222 and a radially inner portion affixed to the hub 1210 by fasteners 1221. The membrane 1220 is resiliently deformable in the axial direction of the hub 1210. A seal is shown at 1227.

The piston 1212 is flanked by two annular compartments 1225, 1226. The lockup clutch 1201 can be engaged (either fully or with slip) or disengaged by altering the fluid pressure in the compartment 1225 and/or 1226 to an extent which is necessary to move the friction lining 1214 axially of the torque converter 1200 toward or away from the friction surface at the inner side of the left-hand wall of the housing 1202.

Figure 21:
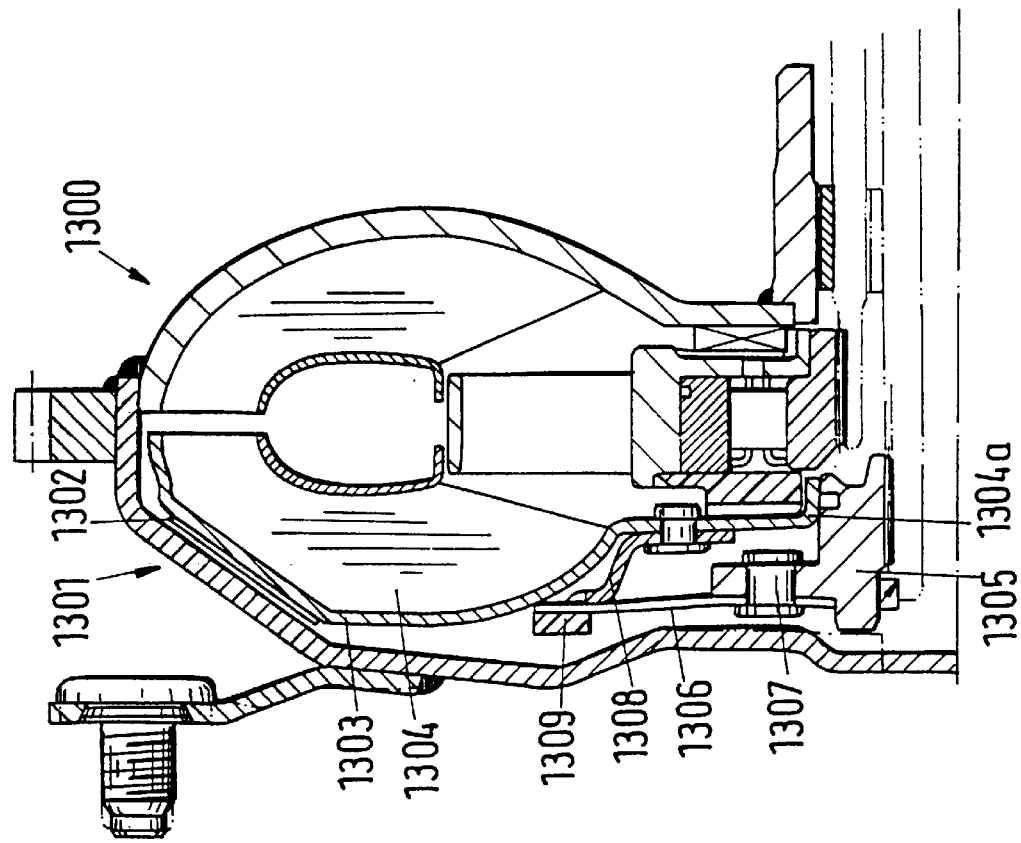
FIG. 21 is a fragmentary axial sectional view of a torque converter constituting a modification of the structure shown in FIG. 20.

The hydrokinetic torque converter 1300 of FIG. 21 comprises a housing for a lockup clutch 1301, a turbine 1304, a pump (of one piece with the housing) and a stator (which is optional). The lockup clutch 1301 does not employ a discrete or separate piston (such as the piston 1212 in the lockup clutch 1201 of FIG. 20) because its axially movable friction lining or friction linings 1302 is or are provided on a conical radially outer portion of the shell 1303 forming part of the turbine 1304. The shell 1303 further comprises a radially inner portion 1304a which is axially movably mounted on the hub 1305 of the turbine. The torque transmitting connection which enables the shell 1303 of the turbine 1304 (and hence the friction lining 1302 of the lockup clutch 1301) to move axially relative to the hub 1305 comprises an axially deformable resilient membrane 1306. The radially inner portion of the membrane 1306 is non-rotatably secured to the hub 1305 by one or more rivets 1307 (and/or other suitable fasteners), and the radially outer portion of the membrane 1306 is non-rotatably affixed to an extension 1308 of the shell 1303 by one or more locking members 1309, e.g., by a single locking member which can be made, at least in part, of a suitable metallic or plastic material. The membrane 1306 can constitute a one-piece annular washer-like body of a metallic, plastic or other suitable material. The illustrated locking member 1309 can constitute a one-piece ring and can establish a snap-on, another form-locking or any further suitable connection between the extension 1308 of the shell 1303 and the hub 1305 of the turbine 1304.

Figure 22:
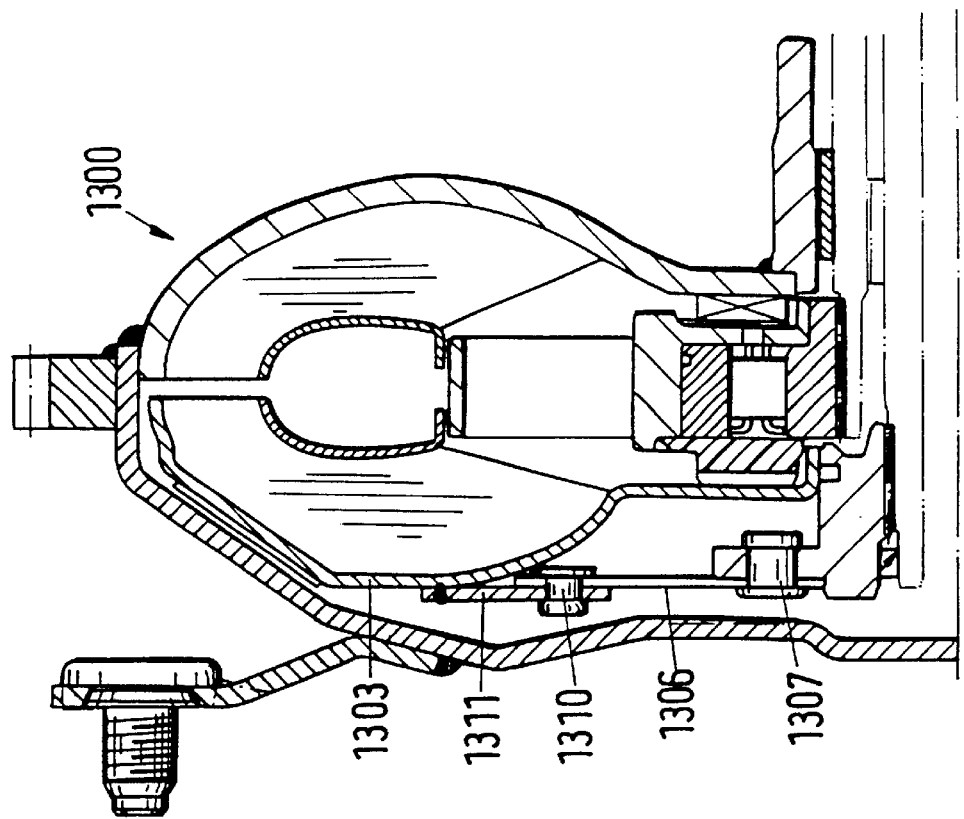
FIG. 22 is a fragmentary axial sectional view of a torque converter constituting a modification of those shown in FIGS. 20 and 21.

FIG. 22 shows a modification of the torque converter 1300 of FIG. 21. The main difference is that the axially deformable resilient membrane 1306 is permanently affixed to an extension 1311 of the shell 1303 of the turbine by a set of rivets 1310 and/or other suitable fasteners. Such fasteners 1310 replace the locking member 1309 in the torque converter 1300 of FIG. 21.

Figure 23:
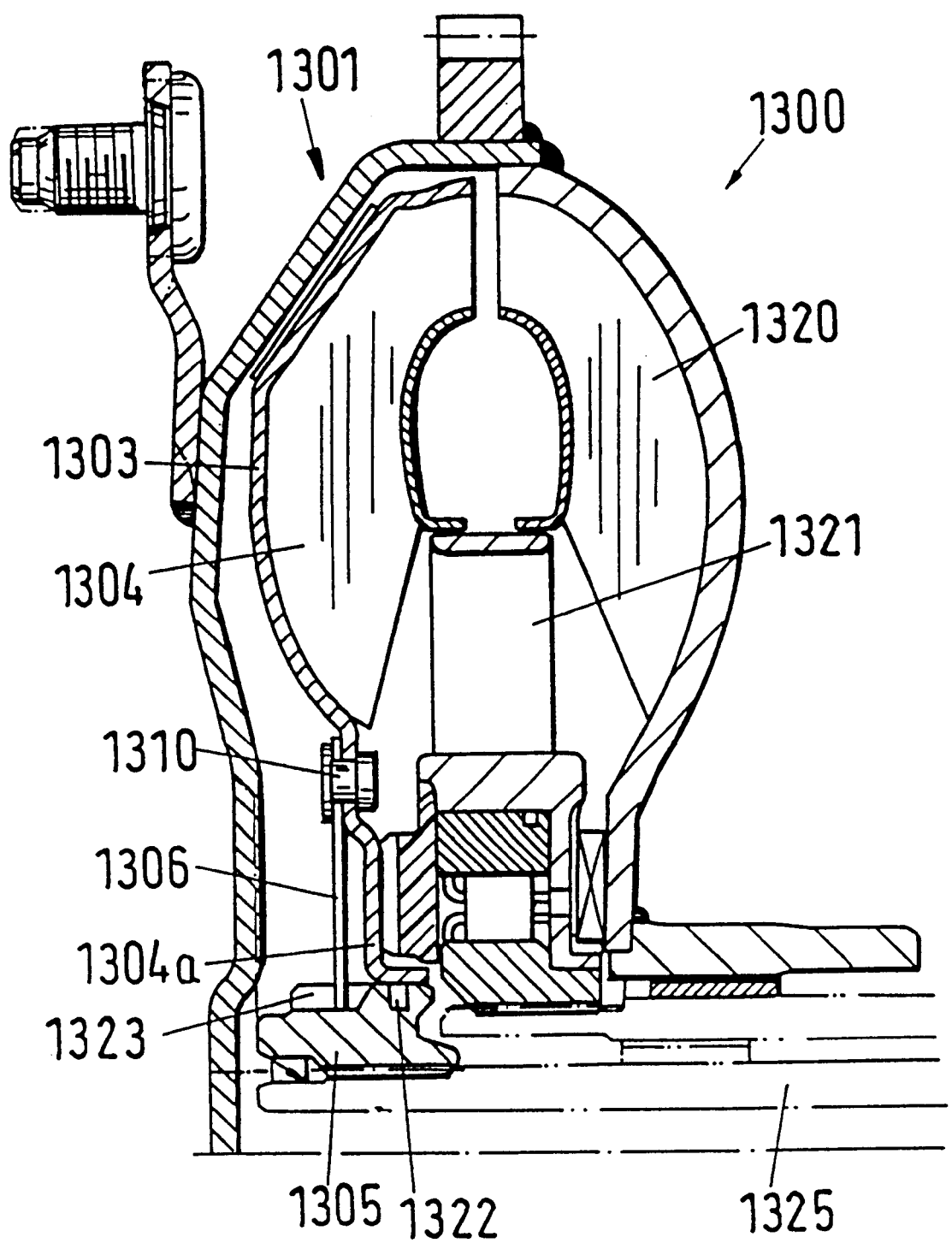
FIG. 23 is a fragmentary axial sectional view of a torque converter constituting a modification of those shown in FIGS. 20 to 22.

FIG. 23 shows a torque converter which constitutes a further modification of the torque converter 1300 of FIG. 21 and a modification of the torque converter of FIG. 22. The only major difference is that the rivets 1310 (or analogous fasteners) fixedly secure the radially outer portion of the membrane 1306 directly to a portion of the shell 1303 of the turbine 1304, and that the radially inner portion of the membrane 1306 is provided with a set of internal teeth mating with complementary external teeth 1323 of the hub 1305 forming part of the turbine 1304. The hub 1305 is held on the input shaft 1325 of the transmission against any, or against appreciable, axial movement and the radially innermost portion 1304a of the shell 1303 is movable axially of the hub 1305 and surrounds a suitable seal 1322 which is recessed into the peripheral surface of the hub.

When the turbine 1304 drives the input shaft 1325 of the transmission, the shell 1303 transmits torque to the membrane 1306 through the rivets 1310, and the internally toothed radially inner portion of the membrane 1306 transmits torque to the external teeth 1323 of the hub 1305 so that the latter can transmit torque to the shaft 1325. At such time, the internal teeth of the membrane 1306 are in rather pronounced frictional engagement with the teeth 1323 of the hub 1305 so that the membrane 1306 is not likely to move axially of the teeth 1323; instead, the membrane is deformed in the axial direction whenever the shell 1303 and the friction lining at the conical radially outer portion of the shell 1303 are to move axially toward or away from the friction lining or friction surface at the inner side of the conical radially outer portion of the left-hand wall of the housing of the torque converter of FIG. 23.

FIG. 23 further shows the pump 1320 (which is of one piece with the right-hand wall of the housing of the torque converter 1300) and the stator 1321 between the turbine 1304 and the pump 1320.

Figure 25:
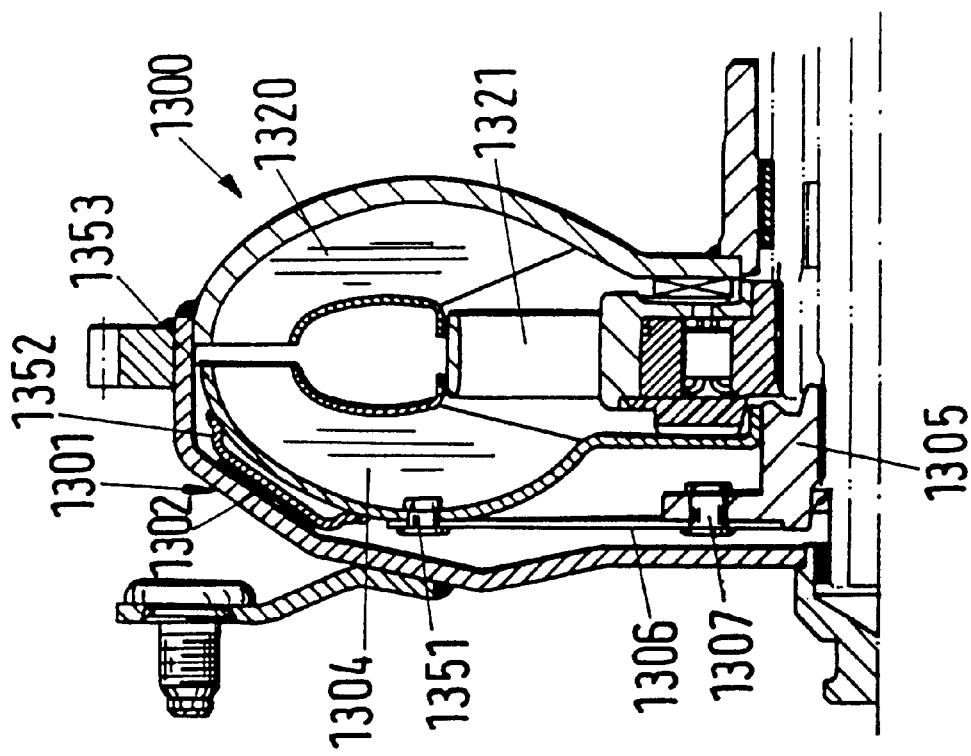
FIG. 25 is a fragmentary axial sectional view of a torque converter constituting still another modification of those shown in FIGS. 20 to 24.
Figure 24:
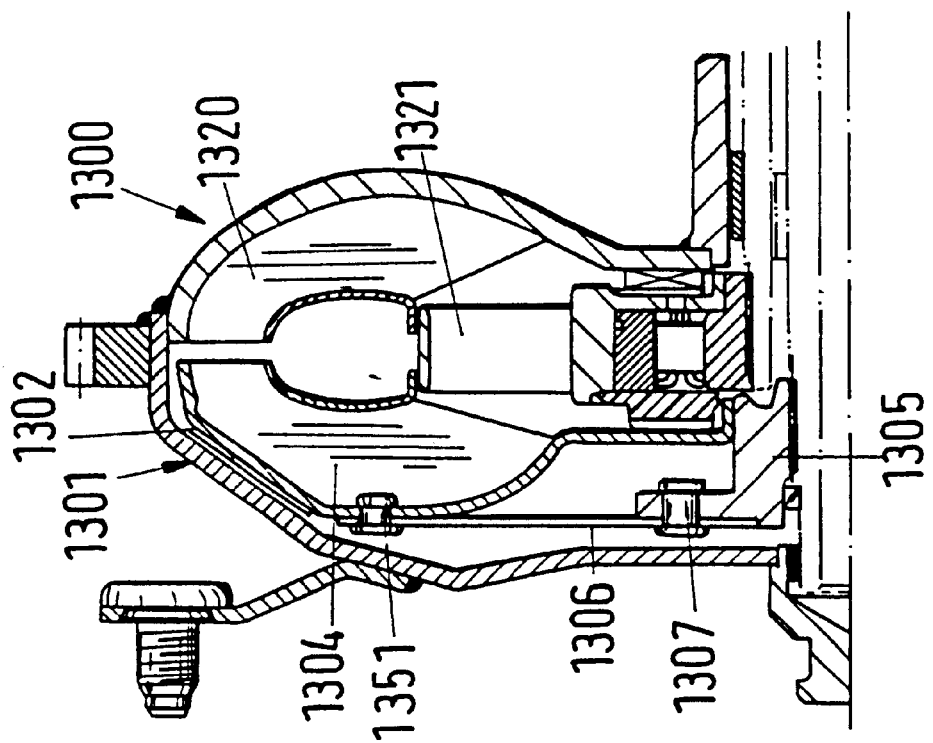
FIG. 24 is a fragmentary axial sectional view of a torque converter constituting a modification of those shown in FIGS. 20 to 23.

FIGS. 24 and 25 show two additional modifications of the torque converter 1300. The only important difference between the structures shown in FIGS. 21 to 23 and the torque converter of FIG. 24 is that the latter comprises an axially deformable membrane 1306 having a radially outer portion fastened to the shell of the turbine 1304 immediately at or closely adjacent to the friction lining 1302 of the lockup clutch. The connection comprises a set of rivets 1351. The radially inner portion of the membrane 1306 of FIG. 24 is secured to the hub 1305 of the turbine 1304. The membrane 1306 enables the shell of the turbine 1304 to move axially of the hub 1305 (with the friction lining 1302 of the lockup clutch 1301) but the membrane holds the shell and the friction lining 1302 against angular movement relative to the hub. The rivets 1351 extend or can extend into that part of the turbine 1304 wherein the vanes or blades on the shell of the turbine circulate the hydraulic fluid.

In the torque converter 1300 of FIG. 25, the friction lining 1302 of the lockup clutch 1301 is mounted on a frustoconical carrier element 1352 which is welded and/or otherwise secured to the convex outer side of the radially outer portion of a shell 1353 forming part of the turbine 1304. The membrane 1306 is connected between the shell 1353 and the hub 1305 of the turbine 1304 in the same way as described with reference to FIG. 24.

Figure 26:
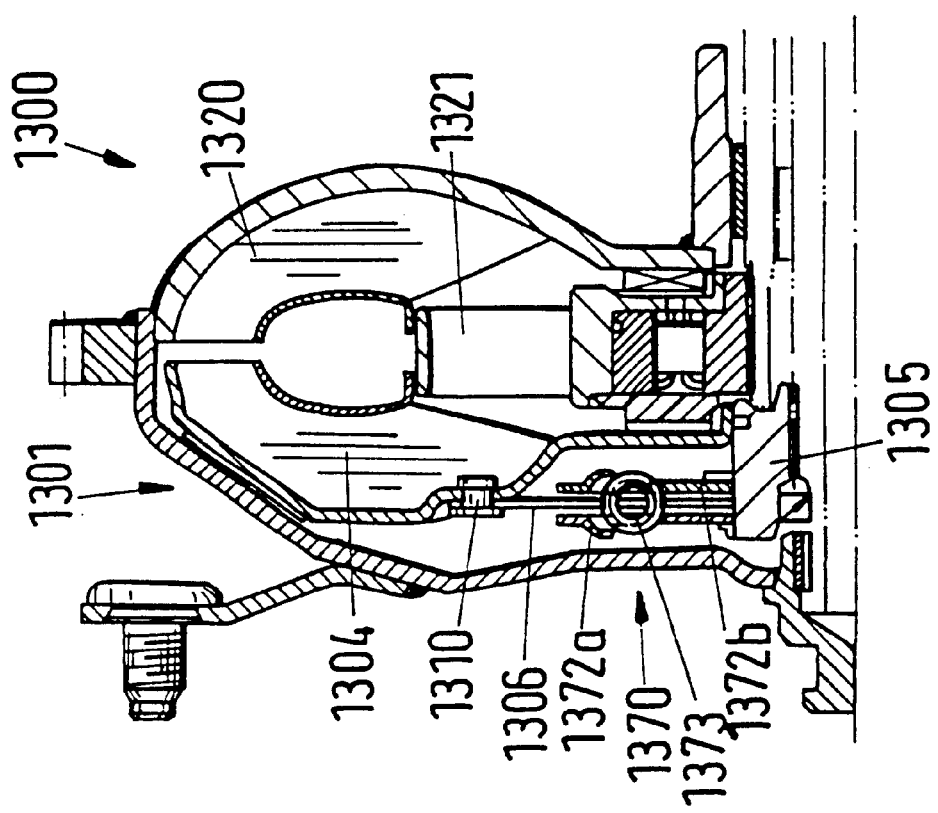
FIG. 26 is a fragmentary axial sectional view of a torque converter constituting an additional modification of those shown in FIGS. 20 to 25.

The torque converter 1300 of FIG. 26 differs from the torque converter of FIG. 23 in that it comprises a torsional vibration damper 1370 which operates between the membrane 1306 and the hub 1305 of the turbine 1304. Thus, the hub 1305 and the membrane 1306 can turn relative to each other but only to the extent determined by the torsional vibration damper 1370. The latter includes the radially inner portion of the membrane 1306 (this membrane can be constructed and dimensioned in such a way that it can yield in the axial direction and, to a certain extent, also in the circumferential direction of the housing of the torque converter 1300) and two annular elements 1372a, 1372b non-rotatably mounted on and surrounding the hub 1305 and coupled to the radially inner portion of the membrane 1306 by a set of energy storing elements 1373. Such energy storing elements can include arcuate coil springs which are received in windows provided therefor in the radially inner portion of the membrane 1306 as well as in windows provided therefor in the annular elements 1372a, 1372b.

The radially outer portion of the membrane 1306 is affixed to the shell of the turbine 1304 by fasteners 1310 at a level similar to but not exactly the same as shown in FIG. 23. The radially inner portion of the membrane 1306 constitutes the input member or element or component, and the elements 1372a, 1372b together constitute a composite output member or element or component of the torsional vibration damper 1370.

Figure 27:
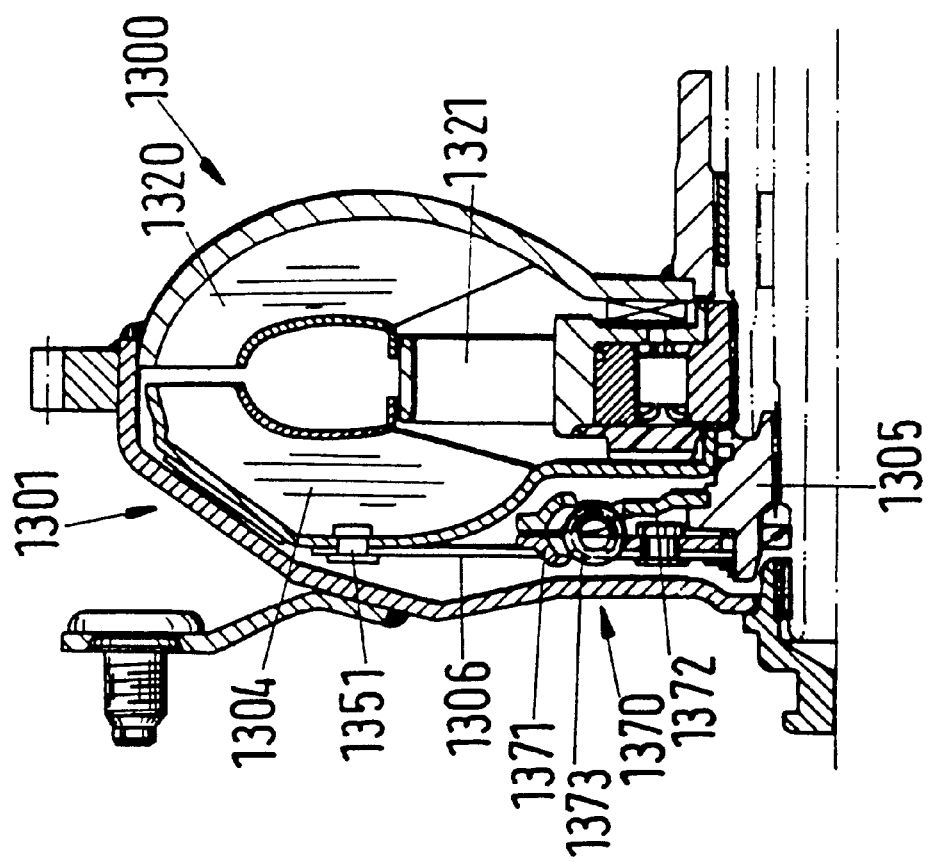
FIG. 27 is a fragmentary axial sectional view of a hydrokinetic torque converter constituting a modification of the structure shown in FIG. 26.

In the torque converter 1300 of FIG. 27, the radially outer portion of the membrane 1306 is affixed to the shell of the turbine 1304 by a set of fasteners 1351 at a considerable radial distance from the axis of the hub 1305, namely close to the friction lining of the lockup clutch 1301. Furthermore, the torque converter of FIG. 27 employs a modified torsional vibration damper 1370. The input element of this damper includes the radially inner portion of the membrane 1306 and an element 1371 which is affixed to the membrane and confronts (across the radially inner portion of the membrane) an annular element 1372 affixed to the hub 1305 in such a way that the element 1372 shares the angular movements of the hub. Energy storing elements 1373 of the damper 1370 are received in aligned windows of the membrane 1306 and element 1371 on the one hand, and in windows provided therefor in the element 1372 on the other hand. The damper 1370 damps torsional vibrations in that it yieldably opposes angular movements of the membrane relative to the hub 1305. The same holds true for the damper 1370 of FIG. 26.

Figure 28:
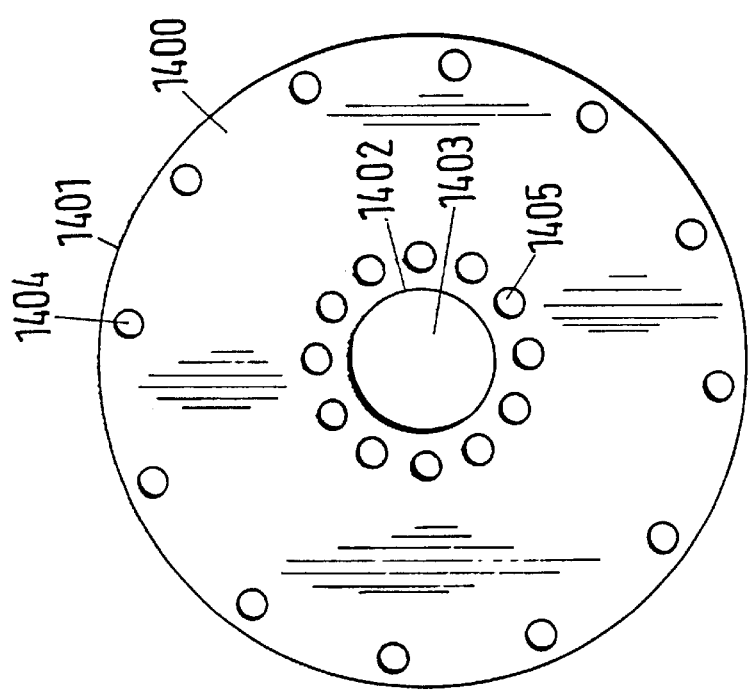
FIG. 28 is a plan view of an axially deformable membrane-like annular element which can be utilized, for example, in the torque converters shown in FIGS. 20 to 27.

FIG. 28 shows a flexible element 1400 which can constitute a membrane of the type shown at 1306 in the torque converter 1300 of FIG. 24. The element 1400 constitutes a circular washer-like body having a radially outer marginal portion 1401 surrounding an annulus of circumferentially spaced-apart equidistant openings 1404 (such openings can receive the shanks or stems of rivets 1351, screws or other suitable fasteners serving to secure the portion 1401 to a support, e.g., to a selected portion of a shell forming part of a turbine, such as the turbine 1304 in the torque converter 1300 of FIG. 24). The radially inner portion 1402 of the flexible element 1400 of FIG. 28 surrounds a circular opening 1403 and is surrounded by an annulus of equidistant openings 1405. These openings can receive the shanks or stems of suitable fasteners, such as the fasteners 1307 shown in FIG. 24 and serving to secure the membrane 1306 to the hub 1305 of the turbine 1304.

The outer marginal portion 1401 and/or the inner marginal portion 1402 of the element 1400 can be provided with an annulus of teeth (not shown). For example, the teeth along the inner marginal portion 1401 can serve the same purpose as the teeth of the radially inner portion of the membrane 1306 shown in FIG. 23.

The openings 1404 and/or 1405 can be omitted if the means for non-rotatably securing the outer marginal portion 1401 of the element 1400 to the shell of a turbine or the like or for non-rotatably securing the inner marginal portion 1402 to the hub of a turbine utilizes one or more fasteners which operate with snap action, which form part of form locking connections or which constitute bayonet mounts or the like.

Figure 29:
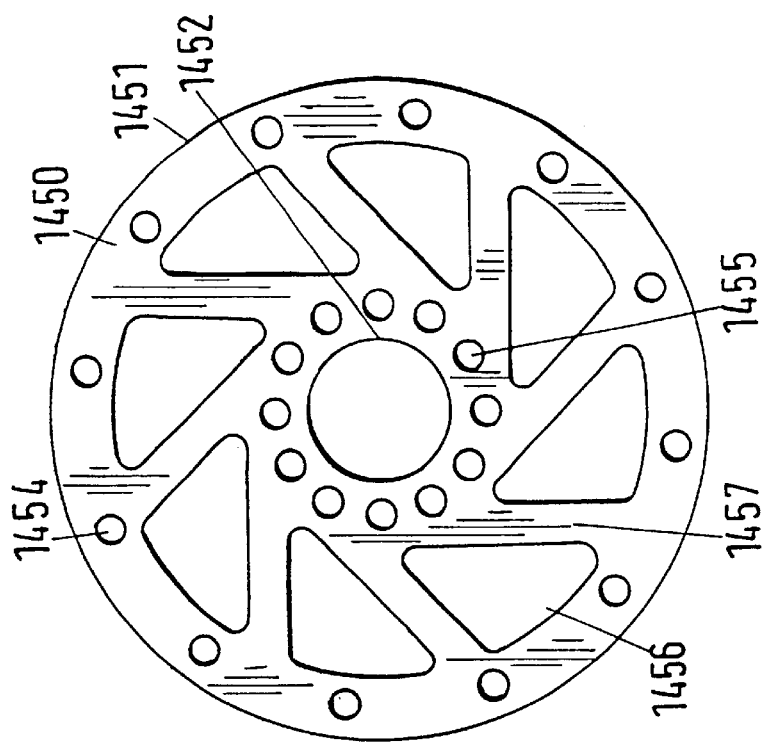
FIG. 29 is a similar plan view of a modified annular element.

The substantially washer-like circular flexible element 1450 of FIG. 29 can serve the same purpose as the axially deformable resilient flexible element 1400 of FIG. 28. The radially outer marginal portion 1451 of the element 1450 is outwardly adjacent an annulus of equidistant openings 1454 which can perform the same function as the openings 1404, and the radially inner marginal portion 1452 of the element 1450 surrounds a central circular opening and is surrounded by an annulus of openings 1455 serving (or adapted to serve) the same purpose as the openings 1405 in the element 1400 of FIG. 28.

The central portion of the element 1450 is provided with an annulus or identical windows or cutouts 1456 which enhance the flexibility of the element 1450 and can optimize its mass. The illustrated windows 1456 have identical sizes and shapes and are equally distributed in the circumferential direction of the element 1450. However, it is equally possible to provide the element 1450 with differently configurated and/or distributed windows which may but need not be of the same size and shape and may but need not be equidistant from each other in the circumferential direction of the element 1450.

The webs 1457 between the windows 1456 of the element 1450 are substantially tangential to the annulus of openings 1455 and can be inclined in or counter to the direction of rotation of the element 1450. Such webs 1457 can be replaced with substantially radially extending webs or by arcuate or otherwise configured webs without departing from the spirit of the instant invention. Furthermore, the thickness and/or the width of the webs between the windows 1456 and/or other types of windows need not be uniform all the way from the annulus of openings 1455 to the annulus of openings 1454.

Figure 30:
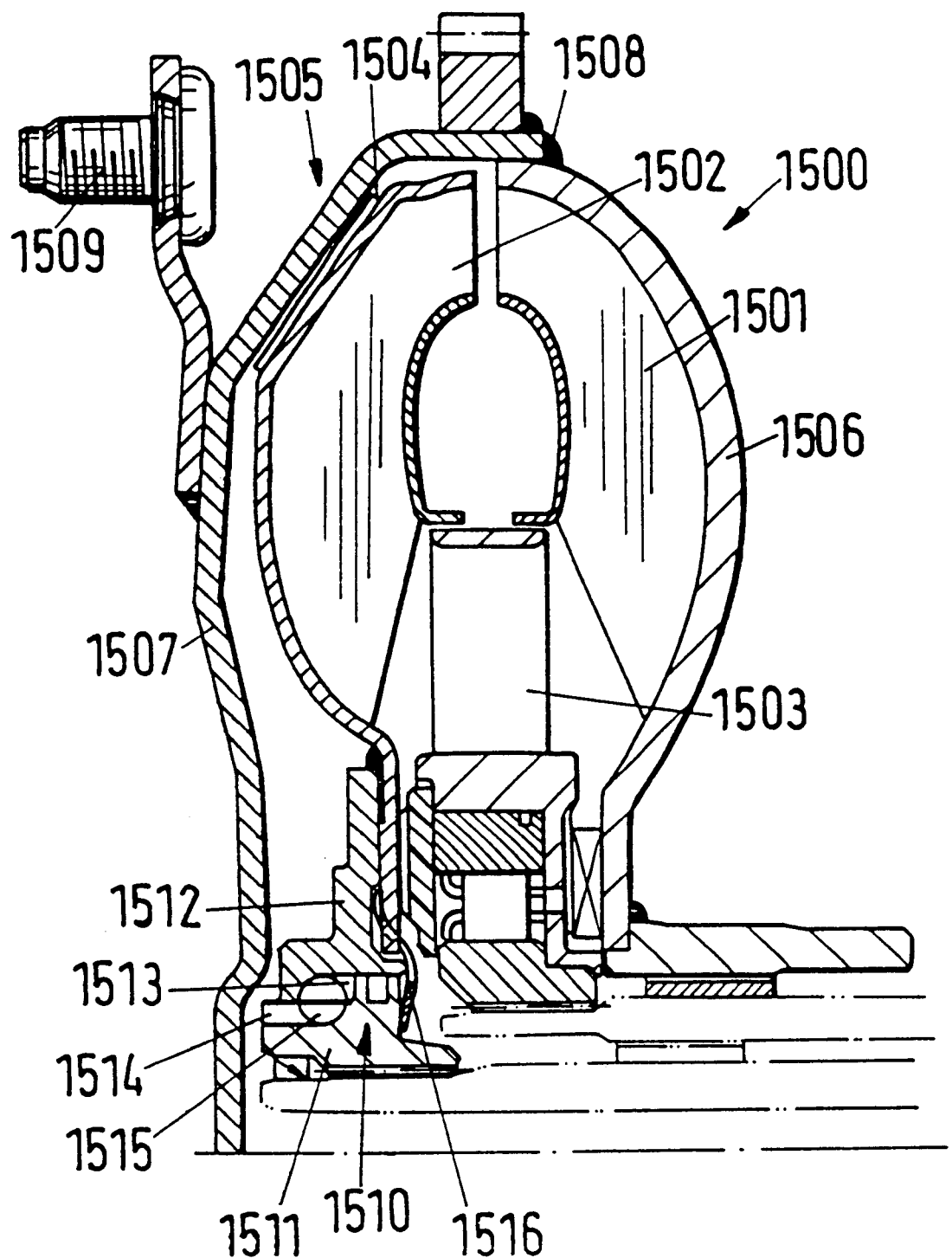
FIG. 30 is a fragmentary axial sectional view of a further hydrokinetic torque converter embodying the present invention.

Referring now to FIG. 30, there is shown a hydrokinetic torque converter 1500 which comprises a rotary housing 1506 for a pump 1501 (this pump can be of one piece with the right-hand wall of the housing 1506), a turbine 1502 and a stator 1503 (the latter is optional). The housing 1506 further confines a lockup clutch 1505 having a friction lining 1504 provided on a conical radially outer portion of the shell of the turbine 1502. The means for attaching the left-hand wall 1507 of the housing 1506 to the output element of a prime mover (such as the axially flexible annular output element 7 shown in FIG. 1) comprises fasteners 1509 which affix an annular extension (or discrete prongs) of the wall 1507 to the flexible output element. The torque converter 1500 can be installed in the power train between the combustion engine and the wheels of a motor vehicle. The two walls of the housing 1506 are sealingly and non-rotatably coupled by a welded joint 1508 or in any other suitable manner. The illustrated threaded fasteners 1509 can be replaced by rivets, by a bayonet mount or by any other suitable torque transmitting means.

The turbine 1502 comprises a shell which carries the customary vanes or blades, and a hub 1510 having a radially outer portion 1512 and a radially inner portion 1511 non-rotatably surrounding the input shaft of a transmission, not shown. The portions 1511, 1512 of the hub 1510 are provided with or carry sets of confronting first and second ramps 1514, 1515, and the ramps of each pair of confronting ramps flank a spherical or otherwise configured rolling element 1515 between them. There is further provided at least one energy storing element 1516 (e.g., a leaf spring or a diaphragm spring) which biases the inner portion 1511 of the hub 1510 axially toward the radially outer portion 1511 so that each rolling element 1515 is always clamped between the respective confronting ramps 1513 and 1514.

For example, when the radially inner portion 1511 of the hub 1510 is stationary but the portion 1512 is free to reacted upon by spring 1516 via elements 1515, it is moved in a direction to disengage the lockup clutch 1505. On the other hand, if the pressure of a hydraulic fluid at the right-hand-side of the shell of the turbine 1502 is sufficiently high, the friction lining 1504 moves in a direction to the left (as viewed in FIG. 30) and the lockup clutch 1505 is at least partially engaged.

If the portion 1511 is caused to turn relative to the portion 1512, the portion 1512 is moved axially in a direction to effect an at least short-lasting engagement of the lockup clutch 1505. This entails the development of a damping action which causes a rotation of the portion 1511 in an opposite direction so that the engagement of the lockup clutch is terminated and the original angular position of the portion 1511 relative to the portion 1512 is restored. It will be seen that the parts 1511, 1512, 1513, 1514, 1515 and 1516 together constitute a highly efficient damper which is located in the region of the hub 1510 and occupies a minimal amount of space.

At least a large percentage of various constituents of the illustrated improved torque converter can be made from metallic sheet material in suitable shaping machines, e.g., by resorting to deep drawing or an analogous procedure or technique.

The means for controlling the operation of the improved torque converter, for example, for partially or fully engaging or disengaging its lockup clutch, can comprise suitable computer means. Such computer means can be designed to cause a full or particularly partial engagement of the clutch so that the latter operates with a certain amount of slip while it is in the process of transmitting torque from the housing to the output element of the torque converter.

A computer or another suitable control or regulating unit can ensure that, in dependency on the operating point, the lockup clutch will be fully engaged or fully disengaged or will operate with an optimum amount of slip. Alternatively, such unit can ensure that the lockup clutch will be automatically fully engaged or fully disengaged or will operate with a fixed or variable slip at certain operating points.

It will be readily appreciated that the features of the numerous hydrokinetic torque converters and/or of their parts (such as lockup clutches and/or torsional vibration dampers) can be combined in any desired manner without departing from the spirit of the present invention. For example, the lockup clutch 800 of FIG. 16*a* can be provided with conical discs and with conical friction linings and can comprise two or more suitably dimensioned and distributed tubular connectors extending through the turbine of the torque converter employing such clutch. Furthermore, the resilient insert 86 can perform several functions; for example, it can permit a tiltable mounting of the lamina 82 and it can also establish a seal between two fluid-containing compartments in the housing 76. The lamina can consist of several discrete parts which are suitably coupled to each other, and such composite lamina can carry a one-piece or a composite friction lining. The friction surface on a wall of the housing of the torque converter and/or the friction lining on a piston of the lockup clutch or on the shell of the turbine can be mounted with limited freedom of angular movement against the opposition of one or more energy storing elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of hydrokinetic torque converters and, therefore, such adaptations should and are intended to be comprehended within the meaning and range of equivalence of the appended claims.

What is claimed is:

1. A hydrokinetic torque converter, comprising:
   a housing rotatable about a predetermined axis;
   means for rotating said housing;
   a pump disposed in and rotatable with said housing;
   a rotary output element coaxial with said housing;
   an axial movable turbine rotatably mounted in said housing and drivingly connected with said output element; and
   a lockup clutch disposed in a power train between said housing and said output element, said clutch being engageable to transmit torque between said housing and said output element and having a first friction surface rotatable with said housing, a complementary second friction surface rotatable with said output element, and an annular carrier for one of said friction surfaces, said carrier and said one friction surface being tiltable about a seat provided between an inner diameter and an outer diameter of said one friction surface.

2. The torque converter of claim 1, wherein one of said friction surfaces forms part of a lamina.

3. The torque converter of claim 1, wherein said one friction surface is said second friction surface.

4. The torque converter of claim 1, wherein said second friction surface is provided on said turbine.

5. The torque converter of claim 4, wherein said turbine has a shell and said second friction surface is provided on said shell.

6. The torque converter of claim 1, wherein at least one of said friction surfaces is an at least partially conical surface.

7. The torque converter of claim 1, wherein said carrier contains a synthetic plastic material.

8. The torque converter of claim 1, wherein, said carrier contains a thermosetting material.

9. The torque converter of claim 1, further comprising a stator in said housing.

10. The torque converter of claim 1, wherein said stator is disposed between said pump and said turbine, as seen in the direction of said axis.

11. A hydrokinetic torque converter comprising:
a housing rotatable about a predetermined axis;
means for rotating said housing;
a pump disposed in and rotatable with said housing;
a rotary output element coaxial with said housing;
an axial movable turbine rotatably mounted in said housing and drivingly connected with said output element;
a lockup clutch disposed in a power train between said housing and said output element, said clutch being engageable to transmit torque between said housing and said output element and having a first friction surface rotatable with said housing, a complementary second friction surface rotatable with said output element, and an annular carrier for one of said friction surfaces, said carrier and said one friction surface being tiltable about a seat provided in said carrier relative to the other of said friction surfaces; and
at least one torsional vibration damper in said power train between said housing and said output element.

12. The torque converter of claim 11, wherein said turbine includes two coaxial components which are rotatable relative to each other about said axis against the opposition of said at least one damper.

* * * * *